United States Patent
Bruce et al.

(10) Patent No.: US 9,157,746 B2
(45) Date of Patent: Oct. 13, 2015

(54) VESSEL ROUTING SYSTEM

(75) Inventors: Alan E. Bruce, Kent, WA (US); Trevor C. Blanarik, Seattle, WA (US); Henry Chen, San Francisco, CA (US); Kyle Nakamoto, Bellevue, WA (US); Daniel J. Gadler, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 13/297,831

(22) Filed: Nov. 16, 2011

(65) Prior Publication Data

US 2013/0124088 A1 May 16, 2013

(51) Int. Cl.
*G01C 21/00* (2006.01)
*G01C 21/20* (2006.01)
*B63B 49/00* (2006.01)

(52) U.S. Cl.
CPC ................ *G01C 21/20* (2013.01); *B63B 49/00* (2013.01); *G01C 21/203* (2013.01)

(58) Field of Classification Search
USPC ............................................ 701/21, 301, 527
See application file for complete search history.

(56) References Cited

U.S. PATENT DOCUMENTS

| | | | |
|---|---|---|---|
| 4,812,990 A * | 3/1989 | Adams et al. ...................... 701/3 |
| 5,631,640 A * | 5/1997 | Deis et al. ...................... 340/961 |
| 6,014,606 A | 1/2000 | Tu |
| 6,085,147 A | 7/2000 | Myers |
| 6,259,988 B1 * | 7/2001 | Galkowski et al. ........... 701/533 |
| 6,269,301 B1 * | 7/2001 | Deker ........................... 701/411 |
| 6,285,951 B1 | 9/2001 | Gaskins et al. |
| 6,487,477 B1 | 11/2002 | Woestman et al. |
| 6,615,130 B2 | 9/2003 | Myr |
| 6,691,007 B2 | 2/2004 | Haugse et al. |
| 6,865,476 B1 | 3/2005 | Jokerst, Sr. |
| 6,885,919 B1 * | 4/2005 | Wyant et al. .................... 701/21 |
| 6,898,516 B2 | 5/2005 | Pechatnikov et al. |
| 6,917,860 B1 | 7/2005 | Robinson et al. |
| 7,209,829 B2 | 4/2007 | Litvack et al. |
| 7,243,134 B2 | 7/2007 | Bruner et al. |
| 7,268,703 B1 * | 9/2007 | Kabel et al. ................... 340/984 |
| 7,471,995 B1 | 12/2008 | Robinson |
| 7,680,595 B2 | 3/2010 | Brinton et al. |
| 7,774,133 B2 | 8/2010 | Schwarzmann |
| 7,778,769 B2 | 8/2010 | Boss et al. |
| 7,807,734 B2 | 10/2010 | Kim |

(Continued)

FOREIGN PATENT DOCUMENTS

| CN | 101344993 | 1/2009 |
|---|---|---|
| EP | 1566665 A1 | 8/2005 |

(Continued)

OTHER PUBLICATIONS

Office Action dated Jul. 25, 2012 regarding U.S. Appl. No. 12/762,003, 29 pages.

(Continued)

*Primary Examiner* — Y. Beaulieu
*Assistant Examiner* — Kevin P Mahne
(74) *Attorney, Agent, or Firm* — Yee & Associates, P.C.

(57) ABSTRACT

A method and apparatus for routing a vessel from a start point to an end point. Routes are generated from the start point to the end point based on a number of objectives. A group of waypoints is added between the two waypoints with respect to the region of interest in response to a segment between two waypoints in a route in the routes crossing a region of interest.

20 Claims, 22 Drawing Sheets

(56) References Cited

U.S. PATENT DOCUMENTS

| | | | |
|---|---|---|---|
| 7,860,646 | B2 | 12/2010 | Bruce et al. |
| 7,930,102 | B2* | 4/2011 | Brent et al. ............... 701/301 |
| 7,949,465 | B2 | 5/2011 | Bruce et al. |
| 7,974,774 | B2 | 7/2011 | Kumar |
| 8,108,138 | B2 | 1/2012 | Bruce et al. |
| 8,155,811 | B2 | 4/2012 | Noffsinger et al. |
| 8,180,507 | B2 | 5/2012 | Dokken |
| 2005/0256639 | A1* | 11/2005 | Aleksic et al. ............. 701/210 |
| 2006/0064242 | A1* | 3/2006 | Litvack et al. ............. 701/202 |
| 2006/0161337 | A1 | 7/2006 | Ng |
| 2006/0241855 | A1 | 10/2006 | Joe et al. |
| 2006/0242108 | A1 | 10/2006 | Cuspard et al. |
| 2007/0064526 | A1 | 3/2007 | Holo |
| 2007/0198178 | A1* | 8/2007 | Trimby et al. ............. 701/209 |
| 2007/0262855 | A1 | 11/2007 | Zuta et al. |
| 2008/0010006 | A1 | 1/2008 | Schwarzmann |
| 2008/0125924 | A1 | 5/2008 | Daum et al. |
| 2008/0172172 | A1* | 7/2008 | Ng ............................. 701/202 |
| 2008/0249667 | A1 | 10/2008 | Horvitz et al. |
| 2008/0312819 | A1* | 12/2008 | Banerjee ..................... 701/202 |
| 2009/0063032 | A1* | 3/2009 | Das ............................ 701/201 |
| 2009/0141587 | A1 | 6/2009 | Welker et al. |
| 2009/0161797 | A1 | 6/2009 | Cowles et al. |
| 2009/0271054 | A1 | 10/2009 | Dokken |
| 2010/0088011 | A1 | 4/2010 | Bruce et al. |
| 2010/0094496 | A1 | 4/2010 | Hershkovitz et al. |
| 2010/0152998 | A1* | 6/2010 | Schwarzmann ............ 701/200 |
| 2010/0158942 | A1 | 6/2010 | Palese et al. |
| 2010/0168942 | A1* | 7/2010 | Noffsinger et al. ........... 701/21 |
| 2010/0174484 | A1 | 7/2010 | Sivasubramaniam et al. |
| 2010/0185471 | A1 | 7/2010 | Chen et al. |
| 2010/0280750 | A1* | 11/2010 | Chen et al. ................. 701/204 |
| 2011/0257819 | A1 | 10/2011 | Chen et al. |
| 2011/0270654 | A1* | 11/2011 | Banerjee et al. ............ 705/14.4 |

FOREIGN PATENT DOCUMENTS

| | | |
|---|---|---|
| FR | 2760282 A1 | 9/1998 |
| GB | 2396729 | 6/2004 |
| JP | 1187611 A | 7/1989 |
| JP | 10307042 A | 11/1998 |
| JP | 2007057499 A | 3/2007 |
| WO | 2004061737 A1 | 7/2004 |
| WO | WO2004066236 | 8/2004 |
| WO | 2004097341 A1 | 11/2004 |
| WO | WO2008029221 | 3/2008 |
| WO | WO2008096376A1 A1 | 8/2008 |
| WO | WO2010008363 | 1/2010 |
| WO | WO2010082989 | 7/2010 |

OTHER PUBLICATIONS

Office Action dated Jul. 12, 2012 regarding U.S. Appl. No. 12/762,100, 28 pages.

Office Action dated Oct. 3, 2012, regarding U.S. Appl. No. 12/355,152, 31 pages.

Final Office Action, dated Feb. 8, 2013, regarding U.S. Appl. No. 12/762,003, 21 pages.

Final Office Action, dated Jan. 10, 2013, regarding U.S. Appl. No. 12/762,100, 21 pages.

EP search report dated Mar. 1, 2013 regarding application 12182388. 4, reference 1284P457EP MW, applicant The Boeing Company, 6 pages.

"AIS Explained", SRT Marine Technology, pp. 1-3, retrieved Mar. 17, 2010 www.srt-marine.com/products-explained.php.

"AIS Guidelines, Recommendations, and Standards" 1 page, retrieved Mar. 17, 2010 www.navcen.uscg.gov/enav/ais/AIS_standards.htm.

"AIS Overview", Navigation Center, 1 page, retrieved Mar. 17, 2010 www.navcen.uscg.gov/enav/ais/.

"An Iridium Story of never Say Die", Satnews Daily, pp. 1-3, retrieved Mar. 17, 2010 www.satnews.com/cgi-bin/story.cgi?number=309555710.

"Andrie Implements FuelTrax", press release, Mar. 9, 2009, FuelTrax Marine Fuel Management, 1 page.

"Annex 1—Guidance on the Use of AIS Application Specific Messages", IMO AIS Binary Message Correspondence Group, Revision of the Guidance on the Application of AIS Binary Messages, Report from the AIS Binary Messages Correspondence Group, Submitted by Sweden, IMO NAV 55 conference, Jul. 2009, 6 Pages vislab-ccom. unh.edu/~schwehr/.../2009-Nav55-CG-AIX-Report-Annex1.pdf.

"Electronic purchasing—a ship supplier speaks", Digital Ship, Apr. 2006, pp. 1-28.

"Fleet Tracking, Iridium Satellite Communication", Blue Sky Network, 1 page, retrieved Mar. 17, 2010 www.blueskynetwork.com/AboutUs/AboutUs.php.

"How AIS Ship Tracking Works", The AIS System, BoatingSF.com, retrieved Mar. 17, 2010, 1 page www.boatingsf.com/ais_explain.php.

Iridium Maritime News Brief, Jun. 2009, pp. 1-4, retrieved Mar. 17, 2010 www.bsl.com/extranet/Iridium/21435_Iridium_newsletter.

"Mobile Data Satellite News Brief", iridium, Mar. 2009 pp. 1-2 http://investor.iridium.com/releasedetail.cfm?ReleaseID=429160.

"Nobeltec Admiral MAX Pro Navigation Software a Comprehensive Solution for Serious Recreational Yachting", Jeppesen Marine, Portland Oregon, May 5, 2008, 1 page, retrieved Mar. 17, 2010 www.jeppesen.com/company/newsroom/articles.

"Tender Tracker Plus Pack", nobeltec.com, Jeppesen Marine, Aug. 2008, pp. 1-2.

Wettergreen et al., "Robotic Planetary Exploration by Sun-Synchronous Navigation", Carnegie Mellon University, Jun. 2001, 8 Pages.

USPTO final office action dated Dec. 14, 2011 regarding U.S. Appl. No. 12/355,152, 35 Pages.

Response to office action dated Sep. 26, 2011 regarding U.S. Appl. No. 12/355,152, 15 Pages.

Amendment submitted with RCE dated Mar. 27, 2012 regarding U.S. Appl. No. 12/355,152, 12 Pages.

Response to office action dated Aug. 23, 2011 regarding U.S. Appl. No. 12/244,291, 21 Pages.

Response to final office action dated Jan. 21, 2011 regarding U.S. Appl. No. 12/872,801, 8 Pages.

Response to office action dated Dec. 8, 2010 regarding U.S. Appl. No. 12/872,801, 15 Pages.

Preliminary amendment dated Aug. 31, 2010 regarding U.S. Appl. No. 12/872,801, 9 Pages.

Response to office action dated Jul. 29, 2010 regarding U.S. Appl. No. 11/735,831, 11 Pages.

Chen et al., "Remote Sensing and Determination of Tactical Ship Readiness", U.S. Appl. No. 12/762,003, filed Apr. 16, 2010, 60 Pages.

International Search Report dated Aug. 9, 2011 regarding Application No. GB1106488.8 conducted by UK searching authority, 7 Pages.

Dijkstra, "A Note on Two Problems in Connexion with Graphs", Numerische Mathematik 1, 1959, pp. 269-271.

Chen, "Weather Routing: a New Approach", Ocean Systems, Inc., pp. 11-15, retrieved Nov. 24, 2008 http://www.ocean-systems.com/papers.htm.

Teti et al., "Sun-Synchronous Lunar Polar Rover as a First Step to Return to the Moon", Proceedings ISAIRAS 2005 Conference, Munich, Germany, Sep. 2005, pp. 1-8 http://tim.barfoot.googleages.com/teti_isairas05.pdf.

Avnet et al., "Lunar Telescope Facility Final Design Report", MIT Aeronautics and Astronautics, 2007, pp. 1-157, full article at: http://ocw.mit.edu/NR/rdonlyres/Aeronautics-and-Astronautics/16-89JSpring-2007/EOOC807D-5D9C-47EC-A8AF-019708EFD1CA/0/report.pdf.

"Mars Autonomy Project Path Planning", 1999, pp. 1-3 http://www.frc.ri.cmu.edu/projects/mars/dstar.html.

Bradley et al., "Preliminary Concepts for a long-range Mars Rover Navigation System Prototype based on a Mars Global Terrain Database", Research Report No. 2001-695-18, Department of Computer Science, University of Calgary, Calgary Canada, pp. 1-9, architecture:http://dspace.ucalgary.ca/bitstream/1880/46267/2/2001-695-18.pdf.

(56) References Cited

OTHER PUBLICATIONS

Team MCNAV, "DARPA Lunar Grand Challenge 2005—MBARS", MCNAV System & Software Architecture (SSA), Carnegie Mellon University, Jul. 2005, pp. 1-11.
Thrun et al., "Stanley: The Robot that Won the DARPA Grand Challenge", Journal of Field Robotics 23(9), 2006, pp. 661-692.
Chen et al., "Use of Operation Support Information Technology to Increase Ship Safety and Efficiency", Transactions, vol. 106, 1998, pp. 105-127.
PCT International Search Report dated Aug. 4, 2010 regarding International application PCT/US09/67375 dated Aug. 4, 2010.
USPTO Non-final office action dated Jun. 24, 2011 regarding U.S. Appl. No. 12/355,152.
USPTO Non-final office action dated Jun. 28, 2010 regarding U.S. Appl. No. 11/735,831.
Hinnenthal, "Robust Pareto—Optimum Routing of Ships Utilizing Deterministic and Ensemble Weather Forecasts," Berlin University of Technology, approved dissertation for Doctor of Engineering Sciences, Mar. 2008, 149 pp.
USPTO Non-final office action dated May 27, 2011 regarding U.S. Appl. No. 12/244,291.
USPTO Notice of allowance dated Oct. 5, 2011 regarding U.S. Appl. No. 12/244,291.
USPTO Notice of allowance dated Sep. 1, 2010 regarding U.S. Appl. No. 11/735,831.
USPTO Non-final office action dated Sep. 29, 2010 regarding U.S. Appl. No. 12/872,801.
USPTO Final office action dated Jan. 10, 2011 regarding U.S. Appl. No. 12/872,801.
USPTO Notice of allowance dated Jan. 28, 2011 regarding U.S. Appl. No. 12/872,801.
EP search report dated Aug. 26, 2013 regarding application 09802064.7-1955/2389592 PCT/US2009067375, reference P52172EP-K/RGBH, applicant The Boeing Company, 6 pages.
Office Action dated Nov. 5, 2013 regarding U.S. Appl. No. 12/355,152, 38 pages.
Final Office Action, dated Apr. 25, 2013, regarding U.S. Appl. No. 12/355,152, 42 pages.
King et al., "Maneuvering simulations of pusher-barge systems," Journal of Marine Science and Technology, vol. 13, No. 2, May 2008, pp. 117-126.
Final Office Action, dated Mar. 28, 2014, regarding U.S. Appl. No. 12/355,152, 49 pages.
Notice of Allowance, dated Jun. 9, 2014, regarding U.S. Appl. No. 12/355,152, 22 pages.

* cited by examiner

US 9,157,746 B2

VESSEL ROUTING SYSTEM

BACKGROUND INFORMATION

1. Field

The present disclosure relates generally to vessels and, in particular, to routing vessels. Still more particularly, the present disclosure relates to a method and apparatus for generating a route for a vessel with multiple objectives.

2. Background

Vessels carry cargo, goods, passengers, and/or materials from one port to another port. Vessels may include, for example, tankers, bulk carriers, passenger vessels, container vessels, military vessels, and other suitable types of vessels.

When traveling from a start point to an end point, various factors may be taken into account in selecting a route for a commercial vessel. For example, a desired time of arrival, weather, wave patterns, fuel use, type of cargo being transported, and other factors may be taken into account.

In generating a route for a vessel, various route planning systems may be used. These route planning systems may take into account weather forecasts, vessel performance, and other factors in generating a route.

For example, in one system, routes may be planned by human operators. The expertise of human operators may be valuable, but differences in experience and limitations in analysis may not provide as desirable of a route to meet the objectives for a particular trip. Currently used planning systems for routing vessels may avoid undesirable weather conditions. These undesirable weather conditions may include, for example, without limitation, hurricanes, tropical storms, large waves, and other undesirable conditions. However, routing systems that use weather avoidance may result in undesired arrival times and excess fuel usage.

Therefore, it would be advantageous to have a method and apparatus that takes into account at least some of the issues discussed above as well as possibly other issues.

SUMMARY

In one advantageous embodiment, a method for routing a vessel from a start point to an end point is present. Routes are generated from the start point to the end point based on a number of objectives. A group of waypoints is added between the two waypoints with respect to the region of interest in response to a segment between two waypoints in a route in the routes crossing a region of interest.

In another advantageous embodiment, a method is present for routing a vessel from a start point to an end point. Initial routes are generated. New routes are generated from the initial routes. The new routes are based on modifications to the initial routes. Waypoints are added with respect to a region of interest to any of the new routes that cross the region of interest. An evaluation of the new routes is performed to generate values for a number of objectives for the new routes. A number of routes for the vessel are selected from new routes and any potential routes in a set of potential routes for inclusion in the set of potential routes based on the values for the number of objectives.

In yet another advantageous embodiment, a vessel routing system comprises a route generation tool. The route generation tool is configured to generate routes from a start point to an end point based on a number of objectives. The route generation tool is further configured to add a group of waypoints between the two waypoints with respect to the region of interest in response to a segment between two waypoints in a route in the routes crossing the region of interest.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account one or more different considerations. For example, the different advantageous embodiments recognize and take into account that some currently used techniques for generating routes may take more time than desired. For example, some approaches for generating a route build a spanning tree from a start point to a destination. The spanning tree covers a search space for a route. This process may identify a route that avoids undesired weather conditions. The different advantageous embodiments recognize and take into account that this type of process takes into account the minimum cost to route to a particular point as points are added to the tree. When the spanning tree touches a destination, a minimal cost point is present and the route is complete.

The different advantageous embodiments recognize and take into account that with this process, if more than one objective is present, additional dimensions are needed in the search space. For example, it may be desirable to minimize fuel usage in addition to avoiding undesired weather conditions.

As dimensions are added, the advantageous embodiments recognize and take into account that the amount of time needed to perform the search for a route increases. In other words, as the number of objectives increases, the amount of time needed to generate a route taking into account the objectives for the route may be greater than desired. Currently used routing systems are not designed to handle multiple objectives, and adding objectives often requires rewriting the software to take into account new objectives. The changes to the routing system may take more time and effort than desired.

For example, many customers may desire to optimize arrival time and fuel usage. Some customers may have additional objectives. For example, a customer shipping produce may include an objective that reduces the bruising or other damage that may occur to the produce over the duration of a route.

The different advantageous embodiments also recognize and take into account that as the number of waypoints in a route increase, the time needed to generate routes also increases. For example, the different advantageous embodiments recognize and take into account that about 20 waypoints may be ideal. With about 20 waypoints, the route may take into account weather and avoid undesired weather systems. The different advantageous embodiments recognize and take into account, however, that with about 20 waypoints, segments of the route may pass through land masses. As a result, more than about 20 waypoints may be used at a cost of increasing the time needed to identify routes.

Thus, the advantageous embodiments provide a method and apparatus for planning a route for a vessel to travel from a start point to an end point. In these illustrative examples, an advantageous embodiment may be implemented in a network data processing system.

Figure 1:
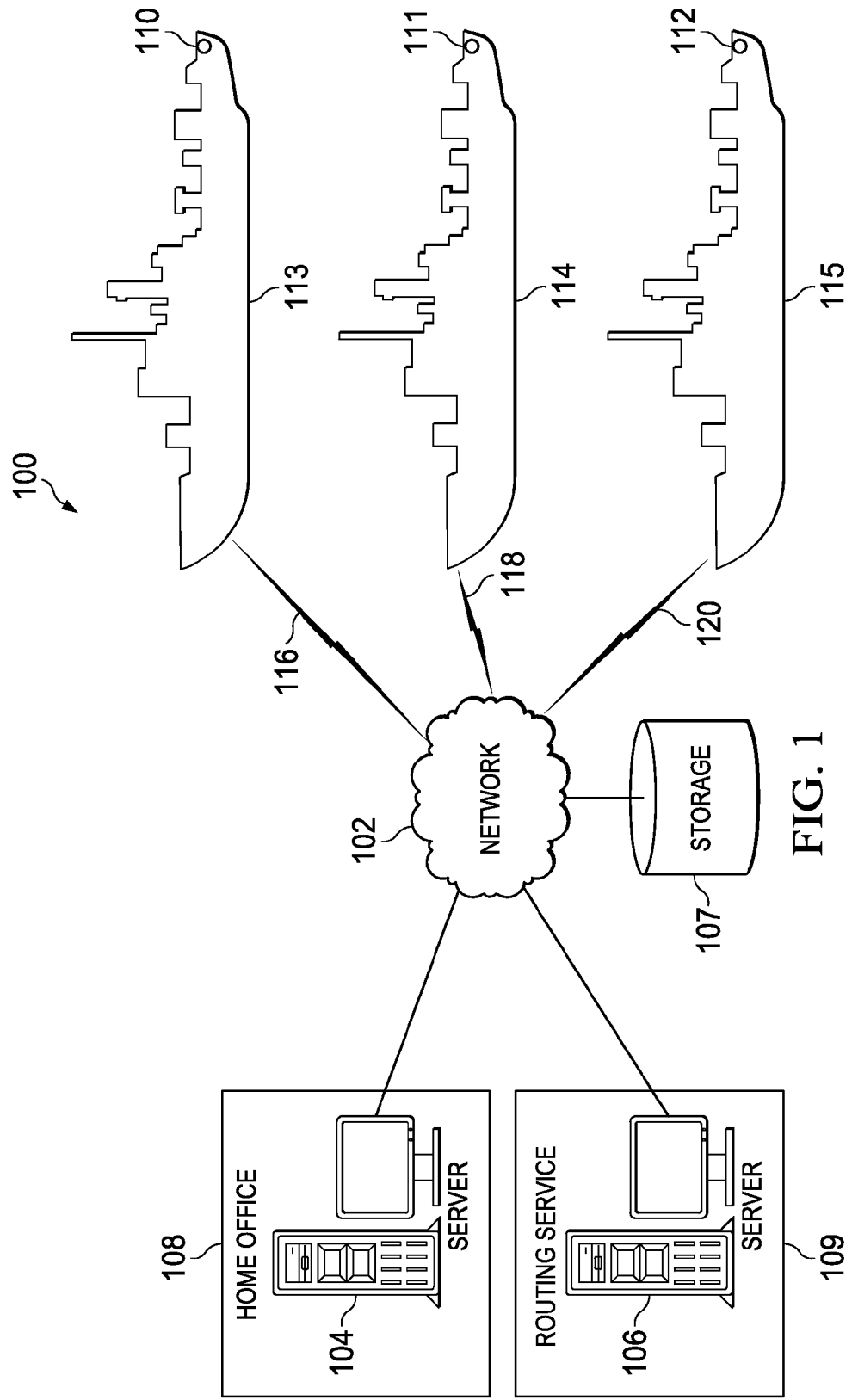
FIG. 1 is an illustration of a network data processing system in which an advantageous embodiment may be implemented.

Turning first to FIG. 1, an illustration of a network data processing system in which an advantageous embodiment may be implemented is depicted. Network data processing system 100 is a network of computers in which one or more advantageous embodiments may be implemented.

Network data processing system 100 contains network 102. This network is the medium used to provide communications links between various devices and computers connected together within network data processing system 100. Network 102 may include connections, such as wired links, wireless communications links, fiber optic cables, and other suitable types of connections.

In these illustrative examples, server 104 and server 106 are connected to network 102 along with storage unit 107. As depicted, server 104 is located at home office 108, and server 106 is located at routing service 109. Home office 108 is the home office for an entity that is managing vessel 110, vessel 111, and vessel 112. Routing service 109 is a service that may provide routing information to vessel 110, vessel 111, and vessel 112. For example, home office 108 may be a customer of routing service 109. As depicted, these vessels are watercraft and may be, for example, tankers, bulk carriers, container vessels, passenger vessels, and other suitable types of vessels.

In these illustrative examples, client computer 113 may be located in vessel 110, client computer 114 may be located in vessel 111, and client computer 115 may be located in vessel 112. Client computer 113, client computer 114, and client computer 115 also connect to network 102 and can be monitored by home office 108 and routing service 109.

In these illustrative examples, client computers 113, 114, and 115 connect to network 102 through wireless communications links 116, 118, and 120, respectively. These wireless communications links may be radio frequency signals, depending on the particular implementation. Additionally, these wireless communications links may be established through satellites within network 102.

Storage unit 107 also connects to network 102. Storage unit 107 may be one or more storage devices, such as hard drives, tape drives, optical drives, and other suitable types of devices. Storage unit 107 may be located in a single location or may be distributed in different locations. In these illustrative examples, storage unit 107 may provide data and other information. For example, storage unit 107 may contain databases used in one or more advantageous embodiments.

In these depicted examples, servers 104 and 106 may generate routes for vessels 110, 111, and 112. In some illustrative examples, the routes may be generated by client computers 113, 114, and 115. In yet other illustrative examples, the generation of routes may be distributed between the servers and clients.

Network data processing system 100 also may include additional servers, clients, and other devices not shown. Network data processing system 100 also may include different types of networks. These networks may include, for example, the Internet, a local area network (LAN), a wide area network (WAN), a satellite network, an intranet, and other suitable types of networks. The illustration of network data processing system 100 in FIG. 1 is intended as an illustrative example and is not intended to be an architectural limitation for the manner in which different advantageous embodiments may be implemented.

Figure 2:
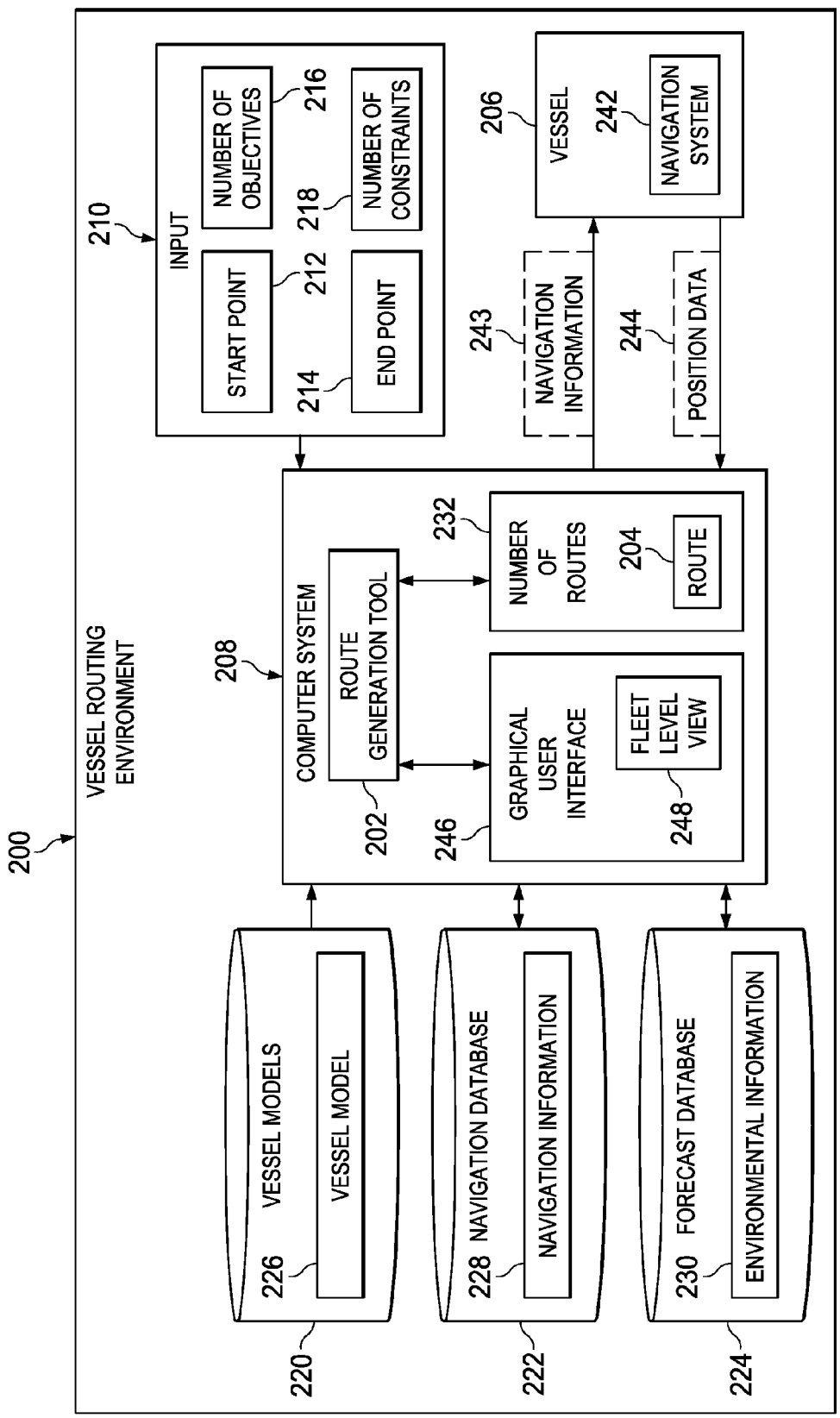
FIG. 2 is an illustration of a block diagram of a vessel routing environment in accordance with an advantageous embodiment.

With reference now to FIG. 2, an illustration of a block diagram of a vessel routing environment is depicted in accordance with an advantageous embodiment. Vessel routing environment 200 may employ network data processing system 100 in FIG. 1 to generate routes for vessels, such as vessels 110, 111, and 112 in FIG. 1.

In this illustrative example, route generation tool 202 may be used to generate route 204 for use by vessel 206. Vessel 206 may be vessel 110, vessel 111, vessel 112, or some other suitable vessel.

Route generation tool 202 may be implemented using software, hardware, or a combination of the two. In particular, route generation tool 202 may be implemented in computer system 208. Computer system 208 is one or more computers. When more than one computer is present in computer system 208, those computers may be in communication with each other. The communication may occur through various communication mediums, such as a network.

For example, computer system 208 may have computers located in at least one of home office 108, routing service 109, vessel 110, vessel 111, vessel 112 in FIG. 1, and other suitable locations. In other words, computer system 208 may be located in one place or may be distributed through multiple locations. As a result, route generation tool 202 also may be similarly distributed.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, route generation tool 202 may generate route 204 for vessel 206 from input 210. Input 210 may include, for example, at least one of start point 212, end point 214, number of objectives 216, and other suitable types of input. As used herein, a "number", when used with reference to an item, means one or more items. For example, "number of objectives 216" is one or more objectives.

Start point 212 is the starting location for route 204. End point 214 is the ending location, or destination, for route 204. In these illustrative examples, start point 212 and end point 214 may be locations of ports. In other illustrative examples, these points may be any suitable location. For example, start point 212 may be a current location of vessel 206.

Number of objectives 216 may include, for example, without limitation, at least one of lateness, fuel consumption, safety of the cargo, safety of the vessel, comfort, maintenance, detectability, gas emissions, and other suitable objectives. As depicted, an objective is something to be attained or accomplished. In these illustrative examples, an objective in number of objectives 216 may be minimized or maximized, depending on the particular implementation.

For example, if an objective in number of objectives 216 is lateness, the objective may be to minimize the lateness of a vessel arriving at an endpoint, such as a port. As another illustrative example, if an objective in number of objectives 216 is safety of the cargo, the objective may be to maximize the safety of the cargo. When number of objectives 216 includes ship safety, the objective may be to increase the safety of the ship. As yet another illustrative example, if an objective in number of objectives 216 is fuel consumption, the objective may be to minimize fuel consumption.

In these illustrative examples, number of objectives 216 may be characterized or described using values. For example, if an objective in number of objectives 216 is fuel consumption, the value for fuel consumption may be total fuel consumed to reach an end point. If an objective in number of objectives 216 is lateness, the value may indicate how late the vessel is with respect to a desired arrival time. This lateness may be measured in hours, days, or some other suitable type of measurement.

As another example, an objective in number of objectives 216 may be to reduce lateness. This objective may be to reduce the lateness to no later than a single time, a range of times, or some combination thereof. The value may be the actual time that vessel 206 arrives at end point 214.

In the depicted examples, route generation tool 202 is configured to take into account multiple objectives for number of objectives 216.

In these illustrative examples, route generation tool 202 may use vessel models 220, navigation database 222, forecast database 224, and other suitable types of information along with input 210 to generate route 204 for vessel 206.

Vessel models 220 may be used to simulate the performance of vessels. For example, vessel model 226 may be a model for vessel 206. Vessel model 226 is configured to predict how vessel 206 may perform in traveling from start point 212 to end point 214.

In particular, vessel model 226 may be used to simulate the performance of vessel 206 with respect to number of objectives 216 in the simulation. Additionally, the performance may be predicted using navigation database 222, forecast database 224, and other suitable sources of information.

Navigation database 222 provides navigation information 228 to route generation tool 202. Navigation information 228 may include, for example, tides and currents for different locations in the seas, location of traffic lanes, location of ports, location of lights and buoys, location of obstructions in shallow water, and other suitable types of information.

Forecast database 224 may provide environmental information 230 to route generation tool 202. Environmental information 230 may include, for example, information about weather, winds, waves, currents, and other suitable types of information. This information may be current information and predicted information for these types of environmental conditions. This environmental information may include multiple predictions that are plausible for the same period of time.

Although navigation database 222 and forecast database 224 are each illustrated as a single component, these databases may be in a single location or may be distributed within different locations, depending on the particular implementation.

In operation, route generation tool 202 may begin by generating number of routes 232. Number of routes 232 may be analyzed using vessel model 226 in conjunction with input 210, navigation information 228, and environmental information 230 in these illustrative examples. The analysis of number of routes 232 may include modifying some portion of number of routes 232 as well as adding new routes to number of routes 232. From number of routes 232, route 204 may be selected for vessel 206.

When route 204 is selected, navigation information 243 for route 204 may be sent to navigation system 242 in vessel 206. In these illustrative examples, navigation system 242 may be software, hardware, or a combination of the two. Navigation system 242 may use navigation information 243 to aid in operating vessel 206.

Further, updates to route 204 may be generated by route generation tool 202. For example, vessel 206 may send position data 244 to route generation tool 202. Position data 244 may be, for example, latitude and longitude for a current position of vessel 206. Position data 244 may be used as a new start point for start point 212 in input 210 to generate an updated route for route 204. Route generation tool 202 may then send navigation information 243 with updates to route 204 to navigation system 242 in vessel 206.

Additionally, route generation tool 202 may also display routes for other vessels in addition to vessel 206 on graphical user interface 246 to provide fleet level view 248. As a result, routes for other vessels, in addition to vessel 206, may be displayed and managed using route generation tool 202.

Figure 3:
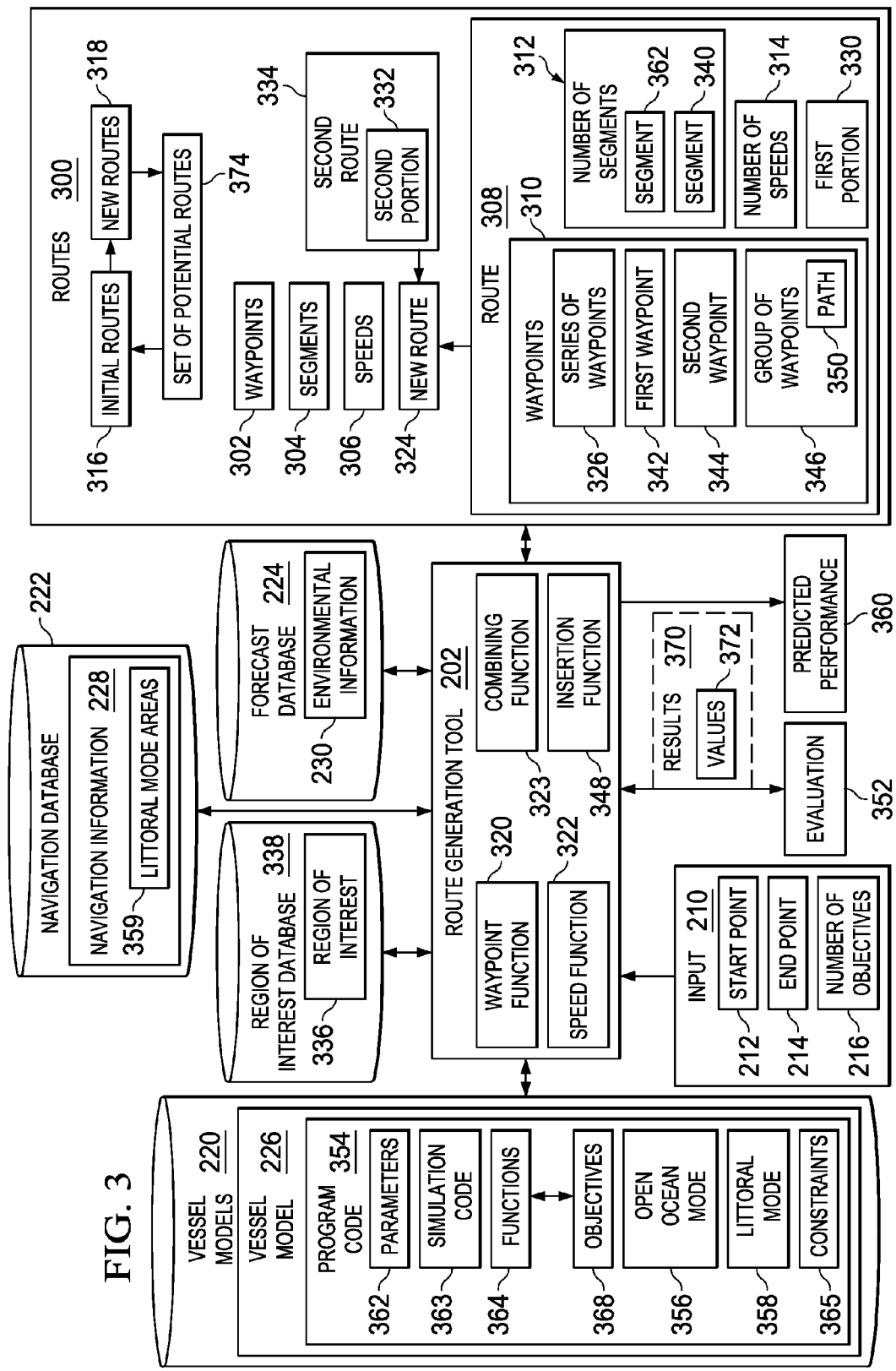
FIG. 3 is an illustration of a block diagram of route generation in accordance with an advantageous embodiment.

With reference now to FIG. 3, an illustration of a block diagram of route generation is depicted in accordance with an advantageous embodiment. In these illustrative examples, route generation tool 202 generates routes 300.

As depicted, routes 300 comprise waypoints 302, segments 304, and speeds 306. Waypoints 302 may include start point 212 and end point 214 as the points for routes 300. Segments 304 are the portions of the route between waypoints 302. Speeds 306 may be the speeds at which a vessel travels on segments 304 to waypoints 302.

For example, route 308 in routes 300 has waypoints 310, number of segments 312, and number of speeds 314. If waypoints 310 only comprise start point 212 and end point 214, number of segments 312 is a single segment. If additional waypoints are present, these waypoints define segments within number of segments 312. Further, each segment may have a speed. In this example, number of speeds 314 may be a single speed for the single segment. In some cases, more than one speed may be present in a segment within number of segments 312. In other illustrative examples, multiple segments in number of segments 312 may have the same speeds or different speeds in number of speeds 314, depending on the particular implementation.

Route generation tool 202 generates initial routes 316 in routes 300 for start point 212 and end point 214 in input 210. In these illustrative examples, initial routes 316 may be generated as any number of routes from start point 212 to end point 214. These routes may be randomly generated, preset seasonal routes for start point 212 and end point 214, or selected in some other manner.

Thereafter, new routes 318 in routes 300 are generated from initial routes 316. In these illustrative examples, new routes 318 may be generated in a number of different ways. As depicted, route generation tool 202 may include at least one of waypoint function 320, speed function 322, combining function 323, and other suitable functions.

Route generation tool 202 may apply at least one of waypoint function 320, speed function 322, combining function 323, and other functions to generate new routes 318.

For example, if route 308 is in new routes 318, route generation tool 202 may create new route 324 from route 308 by modifying series of waypoints 326 in waypoints 310 for route 308. This modification is performed using waypoint function 320 in route generation tool 202. Series of waypoints 326 may be modified by changing the locations of waypoints within series of waypoints 326.

As depicted, series of waypoints 326 comprises one or more waypoints and are sequential waypoints. In this illustrative example, waypoints in series of waypoints 326 are located temporally, one after another with respect to each other.

In another illustrative example, route generation tool 202 may use speed function 322 to change speeds of segments within number of segments 312 in route 308 to generate new route 324 from route 308. The modifications of waypoints and/or speed in route 308 are used to generate new route 324 in addition to route 308 in new routes 318.

In yet another illustrative example, route generation tool 202 may generate new route 324 using combining function 323. In the illustrative examples, combining function 323 combines first portion 330 of route 308 with second portion 332 of second route 334 to form new route 324.

In these illustrative examples, route generation tool 202 also may determine whether any of new routes 318 have segments that cross region of interest 336 in region of interest database 338. Region of interest 336 may be an obstacle that requires more waypoints to navigate around or through region of interest 336. Region of interest 336 may be, for example, at least one of a land mass, a political boundary, a hostile region, or some other suitable region. If any of new routes 318 cross region of interest 336, those routes may be modified. Region of interest 336 may be found in region of interest database 338 in these illustrative examples.

For example, if route 308 is a route in new routes 318 and segment 340 between first waypoint 342 and second waypoint 344 crosses region of interest 336, group of waypoints 346 may be created between first waypoint 342 and second waypoint 344. In this illustrative example, group of waypoints 346 may be created and inserted between first waypoint 342 and second waypoint 344 using insertion function 348 in route generation tool 202. As used here, a "group", when used with reference to items, means one or more items. For example, "group of waypoints 346" is one or more waypoints. Group of waypoints 346 may provide path 350 around region of interest 336, through region of interest 336, or in some other suitable fashion.

Of course, one or more additional groups of waypoints may be generated in addition to group of waypoints 346. In this case, the one or more additional groups of waypoints are used to form one or more additional routes in addition to route 308 with group of waypoints 346.

Next, evaluation 352 is performed for each route in new routes 318 after processing new route 324 to determine whether any segments cross region of interest 336. Evaluation 352 is performed using vessel model 226 for vessel 206 in FIG. 2. Additionally, navigation information 228 from navigation database 222 and environmental information 230 from forecast database 224 may be used with vessel model 226.

In these illustrative examples, vessel model 226 is comprised of program code 354 that is run to perform a simulation for evaluation 352. In these illustrative examples, vessel model 226 may have open ocean mode 356 and littoral mode 358. Open ocean mode 356 for vessel model 226 operates when vessel 206 is in the open ocean. In other words, open ocean mode 356 is used when vessel 206 is some selected distance from a land mass such that depths, channels, and other features need to be taken into account.

Littoral mode 358 is a mode of operation used when vessel 206 is within some selected distance from a land mass. In this illustrative example, littoral mode 358 is a mode for vessel model 226 in which vessel model 226 takes into account ocean depths, tides, currents, traffic separation constraints, and other suitable factors.

In performing a simulation of new routes 318, vessel model 226 may switch between open ocean mode 356 and littoral mode 358 in a number of different ways. For example, littoral mode areas 359 in navigation information 228 may be used to indicate that vessel model 226 should operate in littoral mode 358. For example, when navigation information 228 indicates that a segment in a route is in a littoral mode area in littoral mode areas 359, vessel model 226 operates in littoral mode 358. When a segment is not in a littoral mode area in littoral mode areas 359, vessel model 226 operates in open ocean mode 356.

The simulation may provide predicted performance 360 for vessel 206 over new routes 318. Predicted performance 360 may take into account navigation information 228 and environmental information 230 for different portions of new routes 318. In particular, evaluation 352 may identify how predicted performance 360 meets number of objectives 216 in evaluation 352. In these illustrative examples, predicted performance 360 may include at least one of fuel consumption, speed, and other suitable parameters. These parameters may be calculated for the entire trip, at different times in the trip, and in other suitable fashions.

In these illustrative examples, program code 354 in vessel model 226 may include parameters 362, simulation code 363, functions 364, and constraints 365. Parameters 362 include various parameters for vessel 206. For example, without limitation, parameters 362 may include length, beam, metacentric height, natural roll, maximum speed, and other suitable parameters.

The metacentric height of vessel 206 is a characteristic of vessel 206. This height is used to determine the stability of vessel 206 in water. This parameter has a direct relationship with the (natural) rolling period for a vessel. A vessel with a small value for metacentric height has a longer rolling period. This longer rolling period increases the risk of capsizing in rough sea conditions, rough weather conditions, or other treacherous conditions.

The beam of vessel 206 represents the width of vessel 206 at its widest point. The length represents the length of vessel 206 at the water line in these illustrative examples. Maximum power represents the maximum output of the engines when combined with sea conditions that may limit the speed that vessel 206 may travel. Of course, vessel model 226 may include other parameters that may be used in performing a simulation for evaluation 352.

As depicted, parameters 362 may include constraints 365. Constraints 365 are values that limit parameters 362. Constraints 365 may include operational constraints and environmental constraints. In these illustrative examples, constraints 365 for parameters 362 may be calculated by simulation code 363 in vessel model 226. Constraints 365 may set and/or limit one or more of parameters 362. Constraints 365 may vary from vessel to vessel. A constraint in constraints 365 for a parameter in parameters 362 may be a value and/or multiple values. Constraints 365 affect predicted performance 360 when simulation code 363 runs for evaluation 352.

In these illustrative examples, constraints 365 may include, for example, operational constraints and environmental constraints. Operational constraints may include, for example, roll angle, pitch angle, latitudinal acceleration, vertical acceleration, bow slams per hour, deck submergences per hour, propeller emergences per hour, and other suitable constraints. Environmental constraints may include, for example, height of head seas, height of beam seas, height of following seas, maximum relative wind speed, maximum true wind speed, and other suitable constraints.

Simulation code 363 is the code that generates values for parameters 362 to indicate predicted performance 360. For example, simulation code 363 may be used to generate values for fuel consumption, pitch, roll, and other parameters.

In these illustrative examples, functions 364 is used for objectives 368. Functions 364 are comprised of program code that is run to evaluate objectives 368. Each function in functions 364 may be used for a particular objective in objectives 368. These functions use values for parameters 362 generated by simulation code 363 and also may take into account constraints in constraints 365 that may set limits and/or values for parameters 362.

If the limits and/or values for parameters 362 are not met, constraints 365 are considered to be violated. In these illustrative examples, a determination may be made as to whether values for parameters 362 exceed constraints 365. Constraints 365 may limit and/or set parameters 362 as acceptable values for a set of parameters 362. During the simulation, values for parameters 362 may exceed constraints 365. As a result, if constraints 365 are exceeded, the route is considered infeasible. This infeasibility may be used in comparisons for selecting routes for use in further simulations or for actual use in routing a vessel.

The different illustrative examples favor routes that do not violate constraints 365 or violate constraints 365 by a lesser amount as compared to another amount in these illustrative examples. Particular functions selected in functions 364 may depend on number of objectives 216 in input 210.

Results 370 are generated from running evaluation 352. These results may include values 372 for number of objectives 216.

Functions 364 may be modified as needed. For example, if an objective in number of objectives 216 does not have a corresponding function in functions 364, that objective may be evaluated by adding a new function to functions 364. This system for evaluating objectives with functions 364 may avoid rewriting code, such as simulation code 363 or code in route generation tool 202. The creation of a new function in functions 364 may be performed more easily than making changes to currently available routing systems.

New routes 318 are placed into set of potential routes 374 for processing. A "set", as used herein with reference to items, means one or more items. Set of potential routes 374 is one or more routes. In these illustrative examples, set of potential routes 374 may only comprise new routes 318 the first time processing of routes occurs. If additional processing of routes has occurred, set of potential routes 374 may include routes from previous evaluations that also have values 372.

A determination is then made as to whether the analyzing of new routes 318 has been completed. The analyzing may be completed, for example, when a convergence of routes in set of potential routes 374 is present. This convergence may be identified by comparing routes in set of potential routes 374 with prior sets of potential routes generated during prior evaluations.

Convergence may be determined in a number of different ways. For example, convergence may be present if new routes 318 have not been added to set of potential routes 374 in some selected number of generation of new routes 318 and their evaluation. Convergence also may be present if the current routes in set of potential routes 374 have not had changes that are considered better than routes in set of potential routes 374 at prior times. These and other factors may be analyzed to determine if convergence has occurred with set of potential routes 374.

In other illustrative examples, the processing of new routes 318 may halt after evaluation 352 has been run some number of times or after some number of routes are obtained in set of potential routes 374. For example, the generation of new routes 318 for running evaluation 352 may occur up to about 10 times. Once new routes 318 have been generated about 10 times and evaluation 352 has been run about 10 times, the process may be completed. In another example, the processing of new routes 318 may be complete if about 10 or more routes are present in set of potential routes 374.

If the analyzing of new routes 318 has not been completed, set of potential routes 374 is analyzed, and a determination is made as to which routes will remain in set of potential routes 374 based on the analysis.

The analysis of which routes in set of potential routes 374 will remain in set of potential routes 374 may occur using values 372 in results 370 generated by evaluation 352. This processing of set of potential routes 374 using values 372 is performed to identify which routes in set of potential routes 374 are to be used for further processing.

This identification is made by comparing routes in set of potential routes 374 to each other. The identification of routes in set of potential routes 374 that remain in set of potential routes 374 may be made in a number of different ways.

For example, the selection may be based on identifying routes that best meet number of objectives 216. For example, routes in set of potential routes 374 may be ranked based on values 372 for number of objectives 216. In particular, the values for each objective in number of objectives 216 for each route in set of potential routes 374 may be added to obtain an overall value for comparison. These overall values may then be used to place routes in set of potential routes 374 in an order from greatest value to lowest value to rank new routes 318. A percentage or some selected number of routes in set of potential routes 374 may be selected based on the ranking. The unselected routes are removed from set of potential routes 374.

In another illustrative example, a route in set of potential routes 374 may be evaluated to determine whether the route is to remain in set of potential routes 374. This route may be removed if another route in set of potential routes 374 has values 372 for number of objectives 216 and/or constraints 365 that are equal to or better than the route being evaluated. This type of evaluation may be referred to as dominance.

If another route has values 372 for number of objectives 216 that are equal to or greater than the candidate route, the candidate route is considered dominated and not included in set of potential routes 374. Of course, any suitable selection system may be used to select routes for set of potential routes 374.

Thereafter, set of potential routes 374 is used as initial routes 316 to generate new routes 318 as described above. This process may be repeated as many times as desired.

This process may be repeated until a desired level of convergence has occurred in set of potential routes 374. When the analysis of new routes 318 is completed, a route may be selected for use by vessel 206 from set of potential routes 374 selected from new routes 318.

This selected route forms route 204 for vessel 206. Of course, route 204 for vessel 206 may be re-evaluated during travel by vessel 206 from start point 212 to end point 214. With this example, the current position of vessel 206 or some other position may be used as the new point for generating initial routes 316.

This process of generating routes may be performed prior to vessel 206 traveling to end point 214 or during travel to end point 214. The identification of route 204 may be made periodically and may provide real-time or near real-time updates to route 204. In other words, with route generation tool 202, the identification of route 204 may be made quickly enough to take into account changes in current and predicted environmental conditions.

The illustration of vessel routing environment 200 in FIG. 2 and the generation of routes using route generation tool 202 in FIG. 3 are not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, if an objective is selected for which a function is absent from functions 364, a new function may be generated for that objective and added to program code 354 for vessel model 226. In another illustrative example, vessel model 226 may only include parameters 362. Functions 364 may be placed in a separate library or may be part of route generation tool 202.

Figure 4:
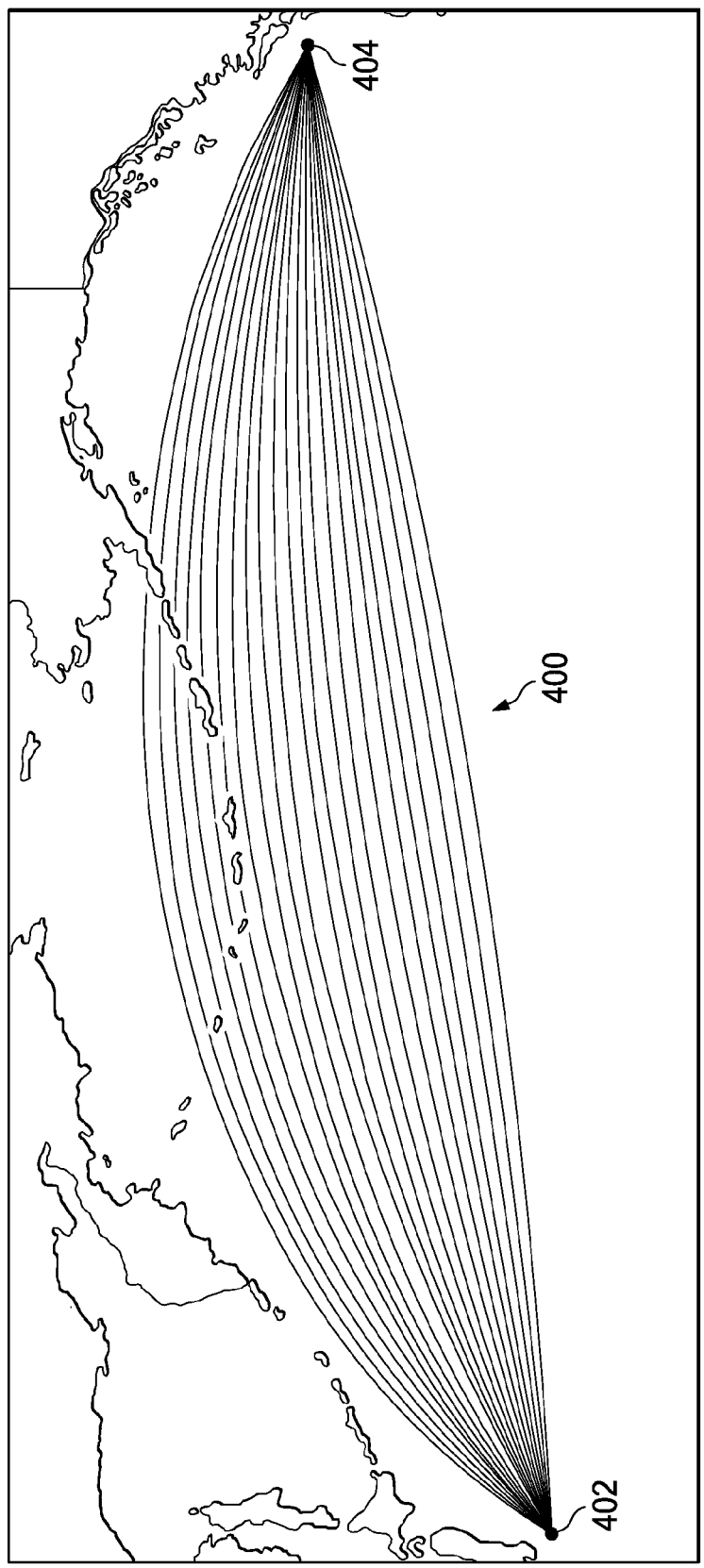
FIG. 4 is an illustration of initial routes in accordance with an advantageous embodiment.

Turning now to FIG. 4, an illustration of initial routes is depicted in accordance with an advantageous embodiment. In this illustrative example, initial routes 400 are illustrated. Initial routes 400 are pictorial illustrations of routes that may be used for initial routes 316 in FIG. 3.

Initial routes 400 are from start point 402 to end point 404. Initial routes 400 may be generated as a random set of potential routes, preset routes, or in some other suitable manner. Initial routes 400 are used for generating one or more routes for use by a vessel to travel from start point 402 to end point 404. The illustration of initial routes 400 illustrates a special distribution of routes.

Initial routes 400 also may include additional routes that have the same waypoints and segments, but different speeds for the segments. These routes are not shown in this illustrative example.

Figure 5:
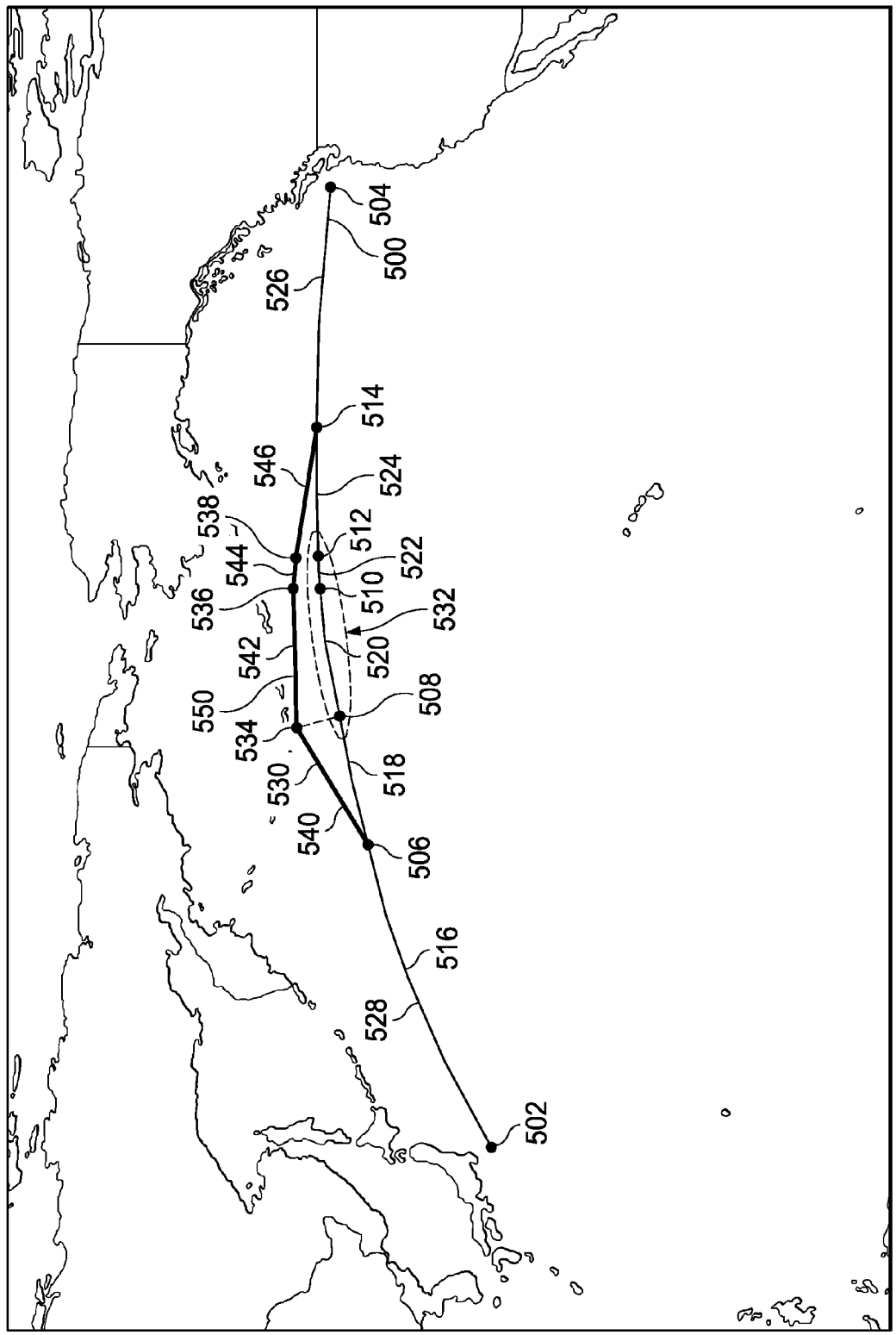
FIG. 5 is an illustration of route modification in accordance with an advantageous embodiment.

Turning now to FIG. 5, an illustration of route modification is depicted in accordance with an advantageous embodiment. As depicted, route 500 is an example of a route that may be modified to create a new route in new routes 318 in FIG. 3. In this illustrative example, route 500 may be modified using waypoint function 320 in FIG. 3.

In this illustrative example, route 500 begins at start point 502 and ends at end point 504. Start point 502 and end point 504 are the beginning and ending waypoints for route 500. As depicted, route 500 also includes waypoints 506, 508, 510, 512, and 514. Segments 516, 518, 520, 522, 524, and 526 are present. These segments and waypoints form path 528 for route 500.

In this illustrative example, a shifting of a portion of the waypoints for route 500 may be performed to generate new route 530. In this illustrative example, new route 530 is generated by shifting series of waypoints 532. New route 530 is an example of a route in new routes 318 in FIG. 3.

As depicted, series of waypoints 532 comprises waypoint 508, waypoint 510, and waypoint 512 located between waypoint 506 and waypoint 514 in route 500. Waypoint 508, waypoint 510, and waypoint 512 are shifted to form waypoint 534, waypoint 536, and waypoint 538. In these illustrative examples, new route 530 includes waypoints 506, 534, 536, 538, and 514 located between start point 502 and end point 504. Further, new route 530 includes segments 516, 540, 542, 544, 546, and 526 between start point 502 and end point 504. These segments and waypoints form path 550 for new route 530. New route 530 is an example of a new route for new routes 318 in FIG. 3.

Figure 6:
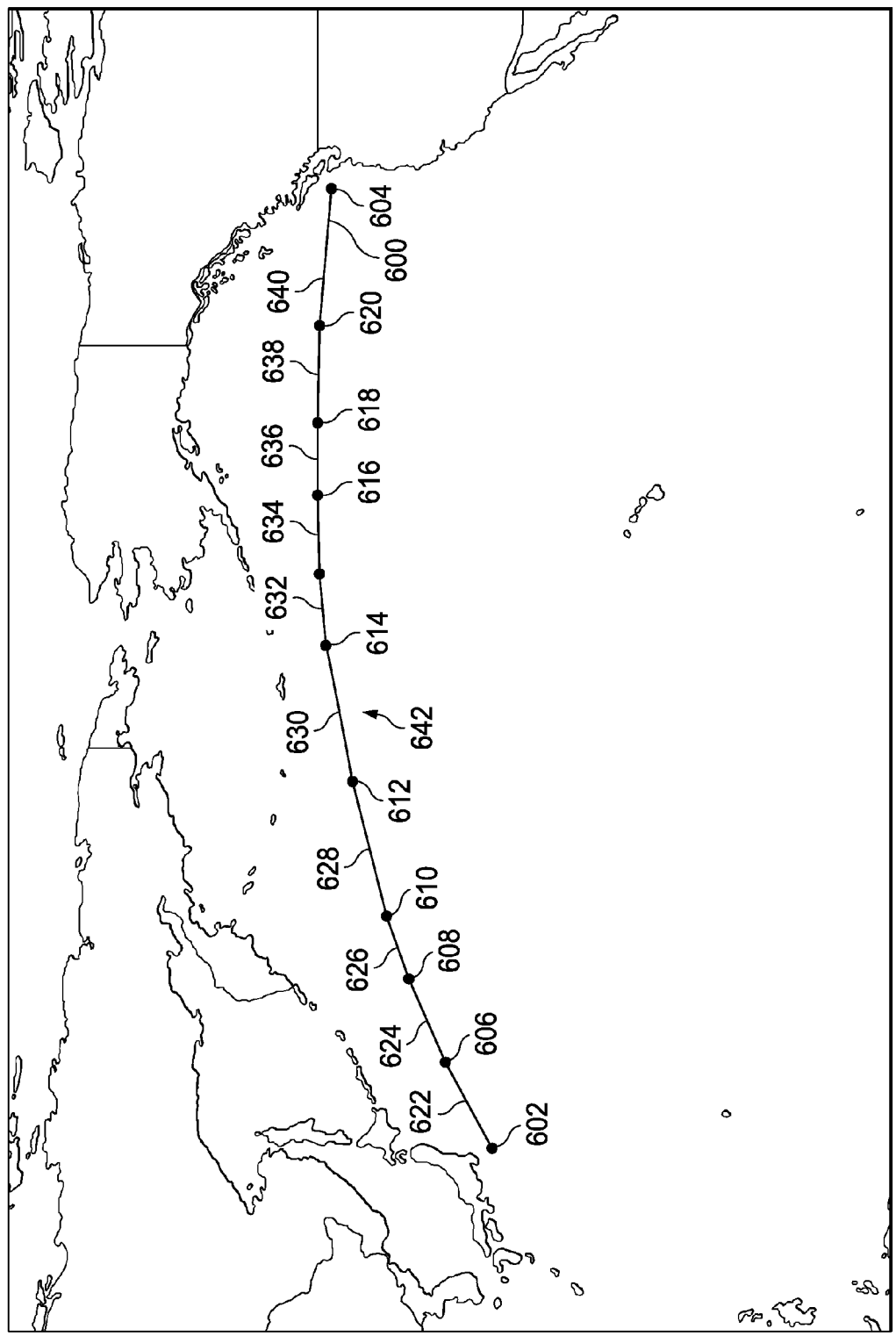
FIG. 6 is an illustration of shifting speeds to generate a new route in accordance with an advantageous embodiment.

Turning now to FIG. 6, an illustration of shifting speeds to generate a new route is depicted in accordance with an advantageous embodiment. Route 600 may be modified to generate a new route for use in new routes 318 in FIG. 3. In this illustrative example, shifting of speeds in segments may be performed using speed function 322 in FIG. 3. In this illustrative example, route 600 begins at start point 602 and ends at end point 604. Route 600 has waypoints 606, 608, 610, 612, 614, 616, 618, and 620. Segments 622, 624, 626, 628, 630, 632, 634, 636, 638, and 640 are located between these waypoints and start point 602 and end point 604. These waypoints and segments form path 642 for route 600.

In these illustrative examples, speed function 322 may be used to change the speed of one or more segments in route 600. The change in speed may be performed to generate a new route having path 642 with different speeds. In other words, the new route will have the same segments and waypoints as route 600. Speeds for the segments may be different from those in route 600.

Figure 7:
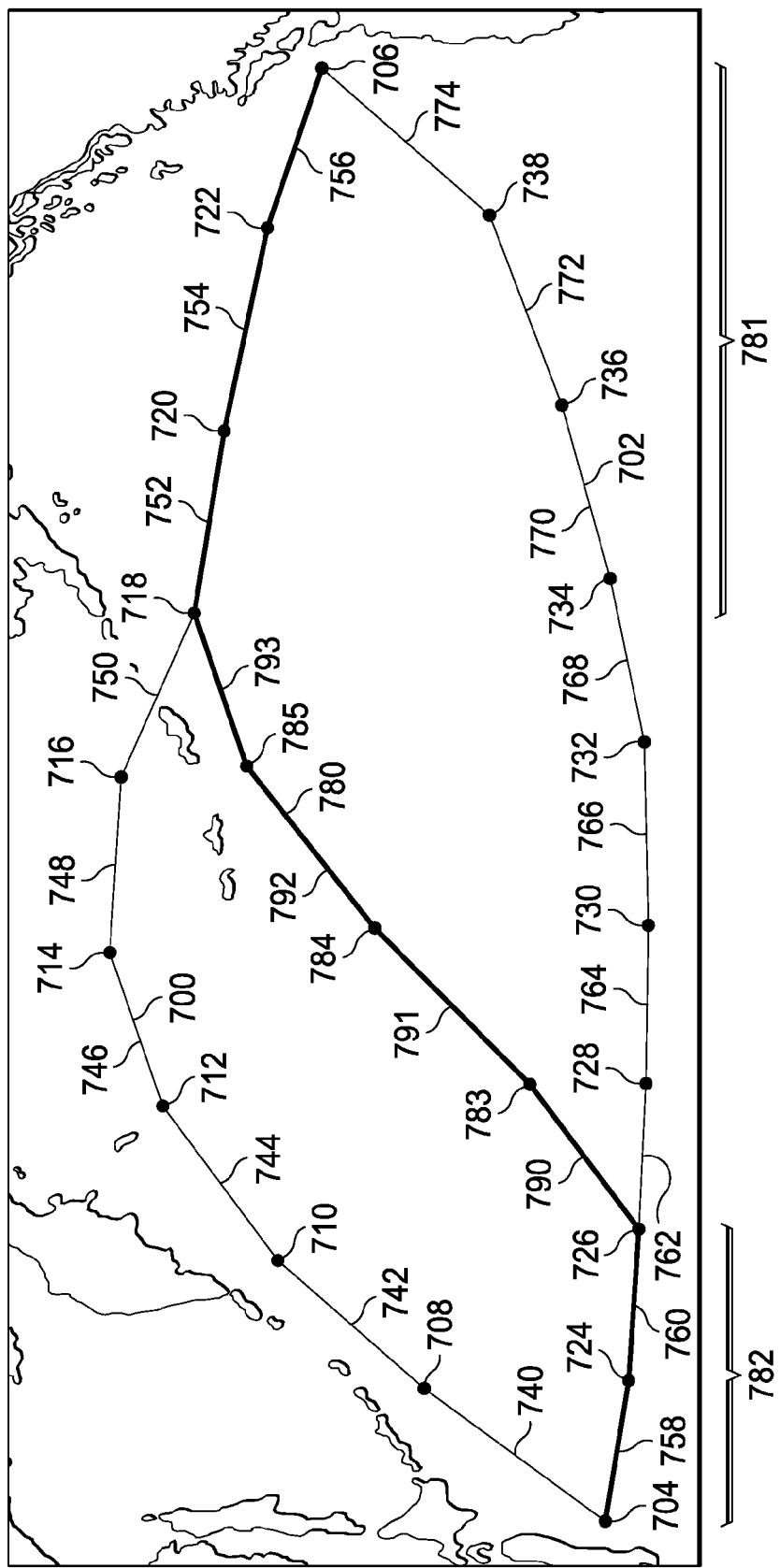
FIG. 7 is an illustration of combining routes to generate a new route in accordance with an advantageous embodiment.

In FIG. 7, an illustration of combining routes to generate a new route is depicted in accordance with an advantageous embodiment. In this illustrative example, the combination of routes to form a new route may be performed using combining function 323 in FIG. 3.

In this illustrative example, route 700 and route 702 are examples of initial routes in initial routes 316 in FIG. 3. In this depicted example, route 700 and route 702 both have start point 704 and end point 706. Route 700 has waypoints 708, 710, 712, 714, 716, 718, 720, and 722. Route 702 has waypoints 724, 726, 728, 730, 732, 734, 736, and 738. Route 700 has segments 740, 742, 744, 746, 748, 750, 752, 754, and 756. Route 702 has segments 758, 760, 762, 764, 766, 768, 770, 772, and 774.

In this illustrative example, route 700 may be combined with route 702 to form route 780. In this illustrative example, portion 781 of route 700 has been combined with portion 782 of route 702 to form route 780. In this illustrative example, portion 781 comprises waypoints 718, 720, 722, and end point 706. Portion 782 comprises start point 704 and waypoints 724 and 726. Waypoints 783, 784, and 785 are generated by interpolating from waypoint 726 in route 702 to waypoint 718 in route 700. This interpolation also forms segments 790, 791, 792, and 793. As a result, route 780 comprises start point 704, waypoints 724, 726, 783, 784, 785, 718, 720, 722, and end point 706. Route 780 includes segments 758, 760, 790, 791, 792, 793, 752, 754, and 756. The portions used from routes 700 and 702 may be selected randomly or through some other selection process.

In this illustrative example, the transition from waypoint 726 in route 702 to waypoint 718 in route 700 includes four segments. Of course, other numbers of segments may be used in the transition in combining route 700 with route 702.

Figure 8:
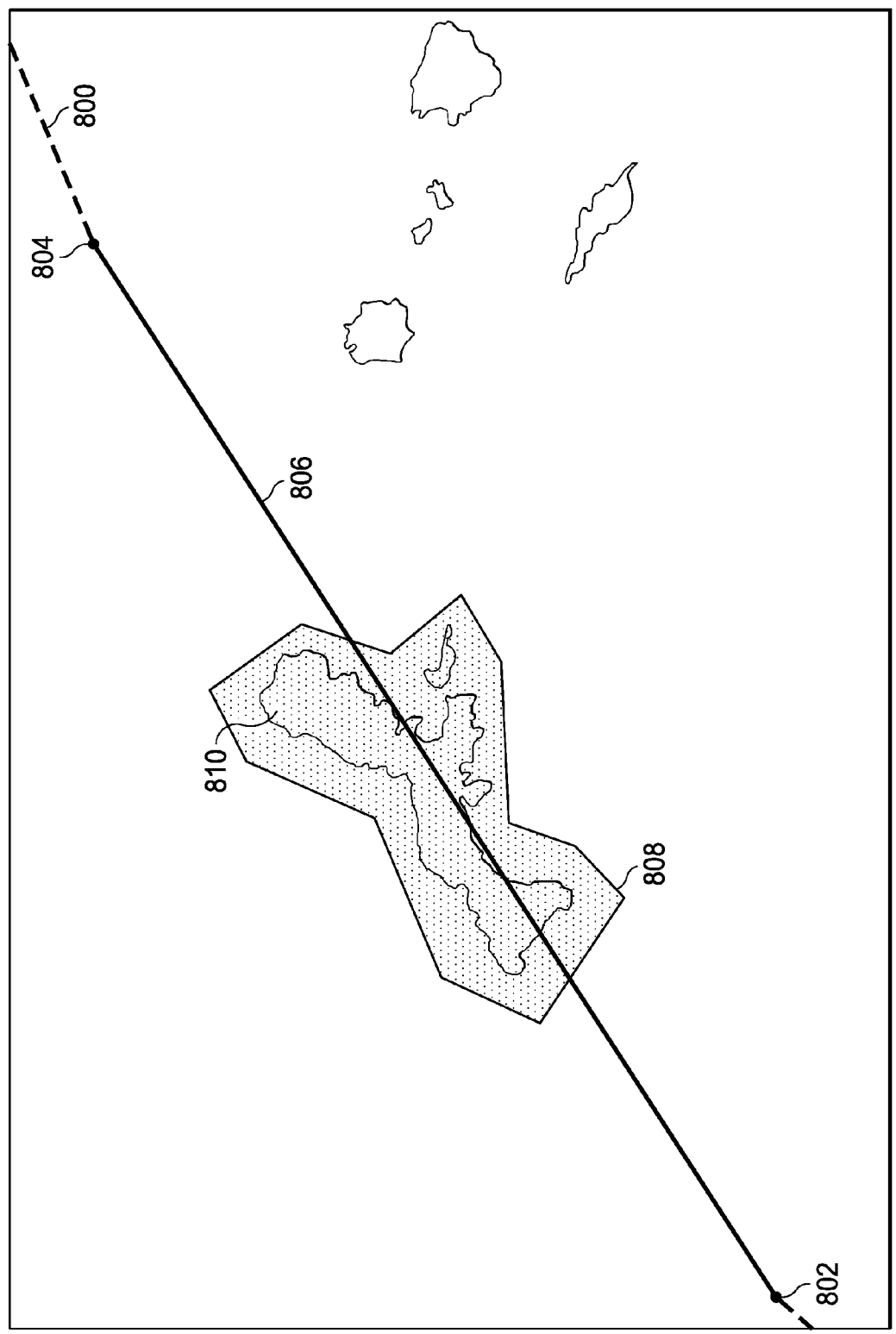
FIG. 8 is an illustration of a portion of a route in accordance with an advantageous embodiment.

Turning now to FIG. 8, an illustration of a portion of a route is depicted in accordance with an advantageous embodiment. In this illustrative example, route 800 includes waypoint 802 and waypoint 804. Segment 806 is located between waypoint 802 and waypoint 804.

In this illustrative example, route 800 crosses region of interest 808. In particular, segment 806 in route 800 crosses region of interest 808. In this illustrative example, region of interest 808 is island 810.

Figure 9:
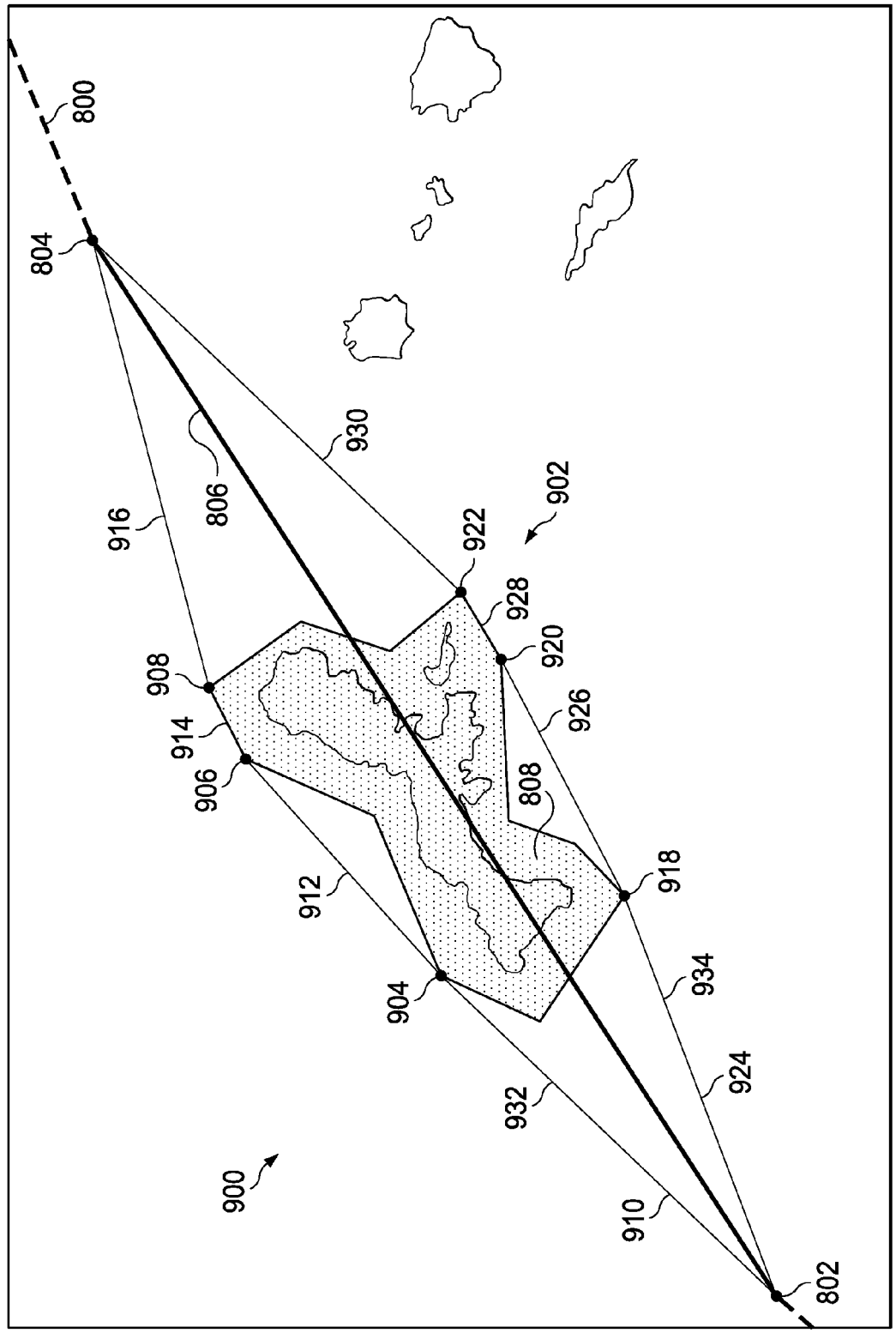
FIG. 9 is an illustration of generating additional waypoints around a region of interest in accordance with an advantageous embodiment.

Turning now to FIG. 9, an illustration of generating additional waypoints around a region of interest is depicted in accordance with an advantageous embodiment. In this illustrative example, insertion function 348 in FIG. 3 may generate first group of waypoints 900 and second group of waypoints 902.

In this illustrative example, first group of waypoints 900 comprises waypoints 904, 906, and 908. These waypoints along with waypoints 802 and 804 define segments 910, 912, 914, and 916.

Second group of waypoints 902 comprises waypoints 918, 920, and 922. With these additional waypoints, segments 924, 926, 928, and 930 are formed in place of segment 806.

Both first group of waypoints 900 and second group of waypoints 902 avoid region of interest 808 in these illustrative examples. A selection of one of these two groups of waypoints may be made based on different factors. In this illustrative example, first group of waypoints 900 is selected, because path 932 formed by these waypoints may be shorter than path 934 formed by second group of waypoints 902. First group of waypoints 900 is then inserted into route 800 to modify the route.

Of course, other selection factors may be used. For example, the route may be selected as one that allows for the vessel to travel at the fastest speed. In yet another example, the selection factors may include choosing between windward exposure and leeward exposure.

In this manner, regions of interest may be taken into account only when regions of interest are encountered by segments between waypoints. As a result, fewer waypoints may be used in initially generating a route. The route may then be modified as needed in this illustrative example.

Figure 10:
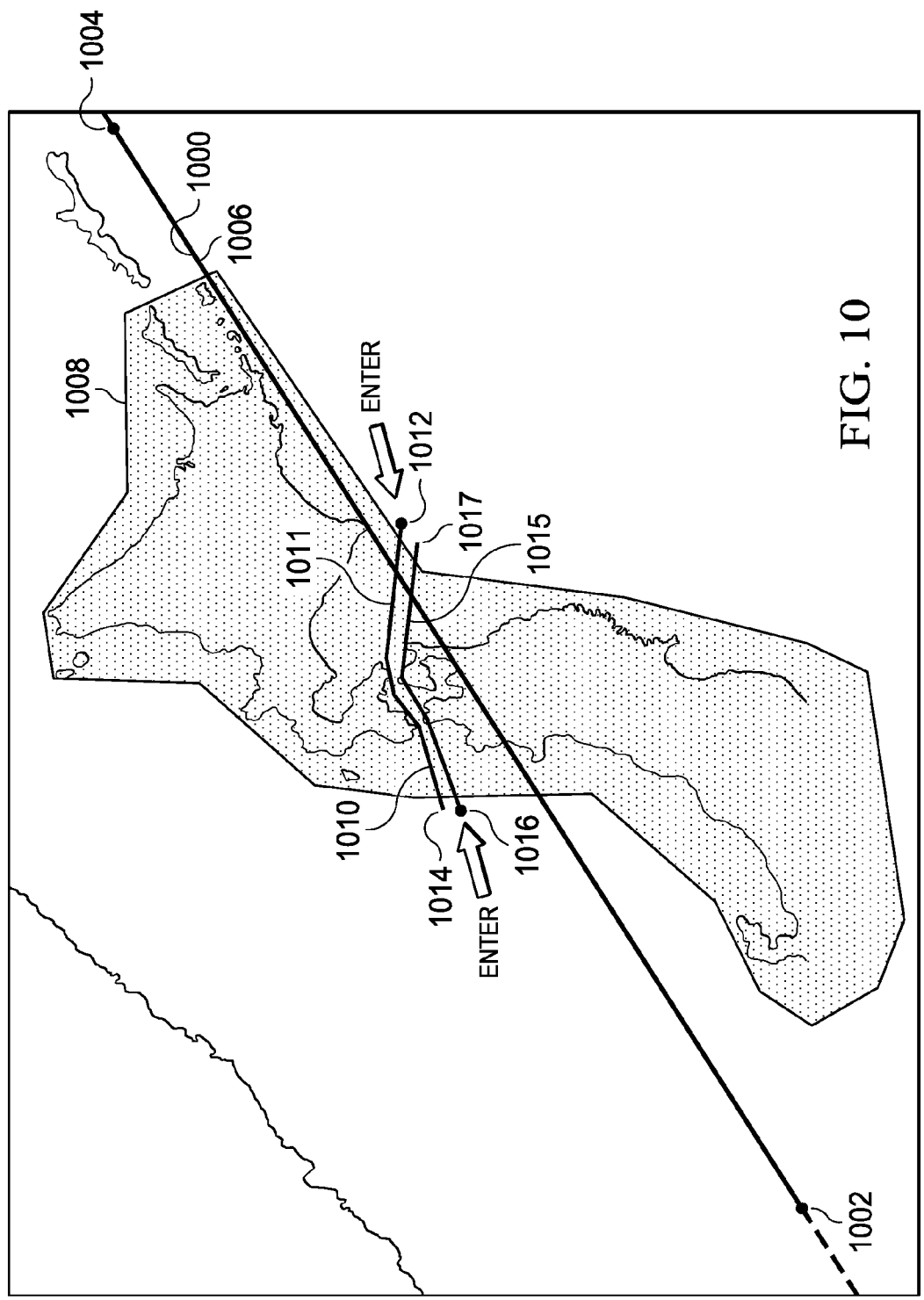
FIG. 10 is another illustration of a route crossing a region of interest in accordance with an advantageous embodiment.

With reference now to FIG. 10, another illustration of a route crossing a region of interest is depicted in accordance with an advantageous embodiment. In this illustrative example, route 1000 includes waypoint 1002 and waypoint 1004. These waypoints define segment 1006. In this illustrative example, segment 1006 crosses region of interest 1008. In this illustrative example, channel 1010 is located within region of interest 1008. Channel 1010 has path 1011, entry 1012, and exit 1014. Channel 1010 also may have path 1015 with entry 1016 and exit 1017. This channel with path 1011 and path 1015 may be taken into account in generating additional groups of waypoints.

Figure 11:
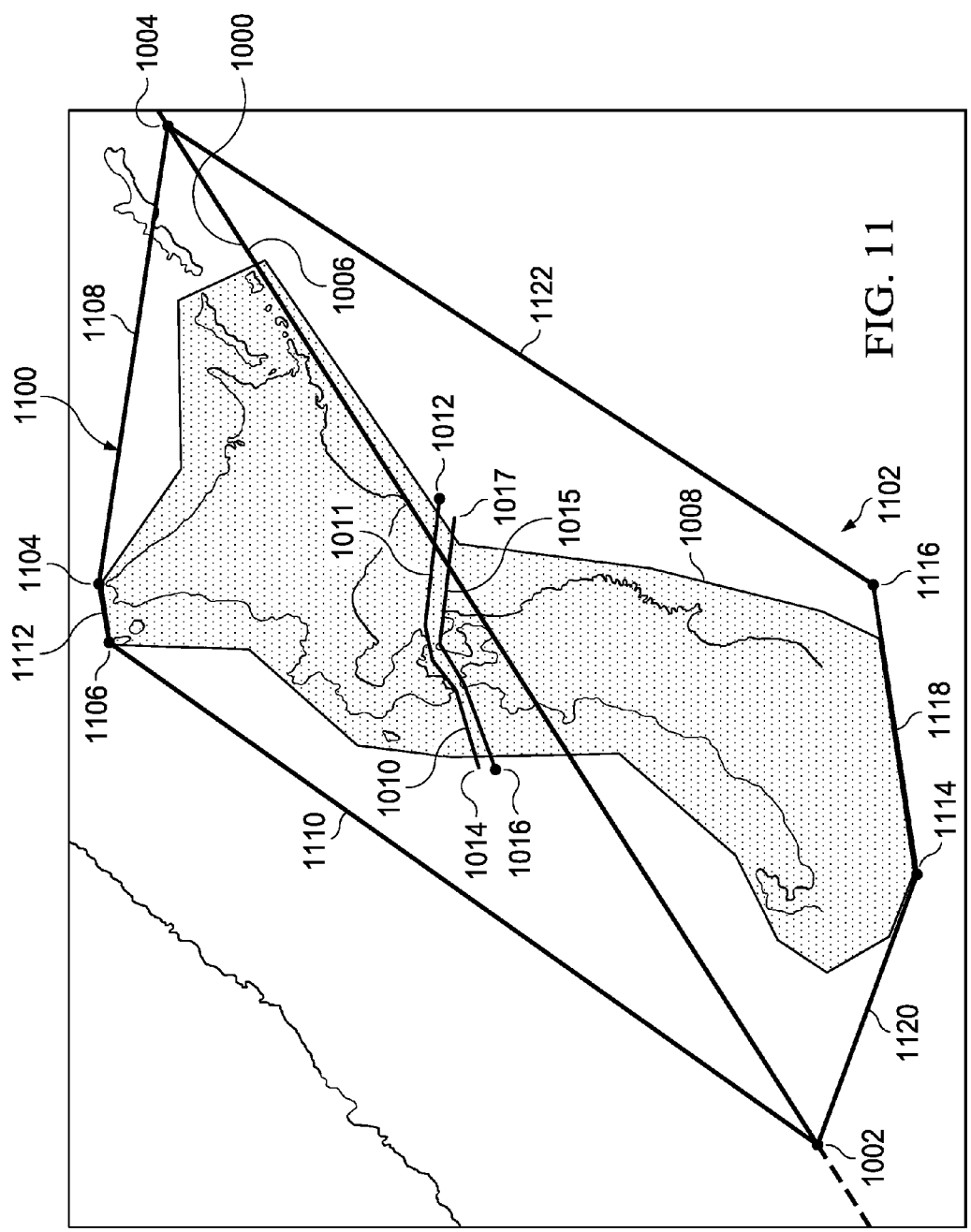
FIG. 11 is an illustration of a waypoint generation for a region of interest in accordance with an advantageous embodiment.

Turning now to FIG. 11, a waypoint generation for a region of interest is depicted in accordance with an advantageous embodiment. In this illustrative example, first group of waypoints 1100 and second group of waypoints 1102 may be generated using an insertion function, such as insertion function 348 in FIG. 3. First group of waypoints 1100 includes waypoints 1104 and 1106. Segments 1108, 1110, and 1112 are defined by these waypoints along with waypoints 1002 and 1004. Second group of waypoints 1102 comprises waypoints 1114 and 1116. These waypoints, along with waypoints 1002 and 1004, define segments 1118, 1120, and 1122.

Figure 12:
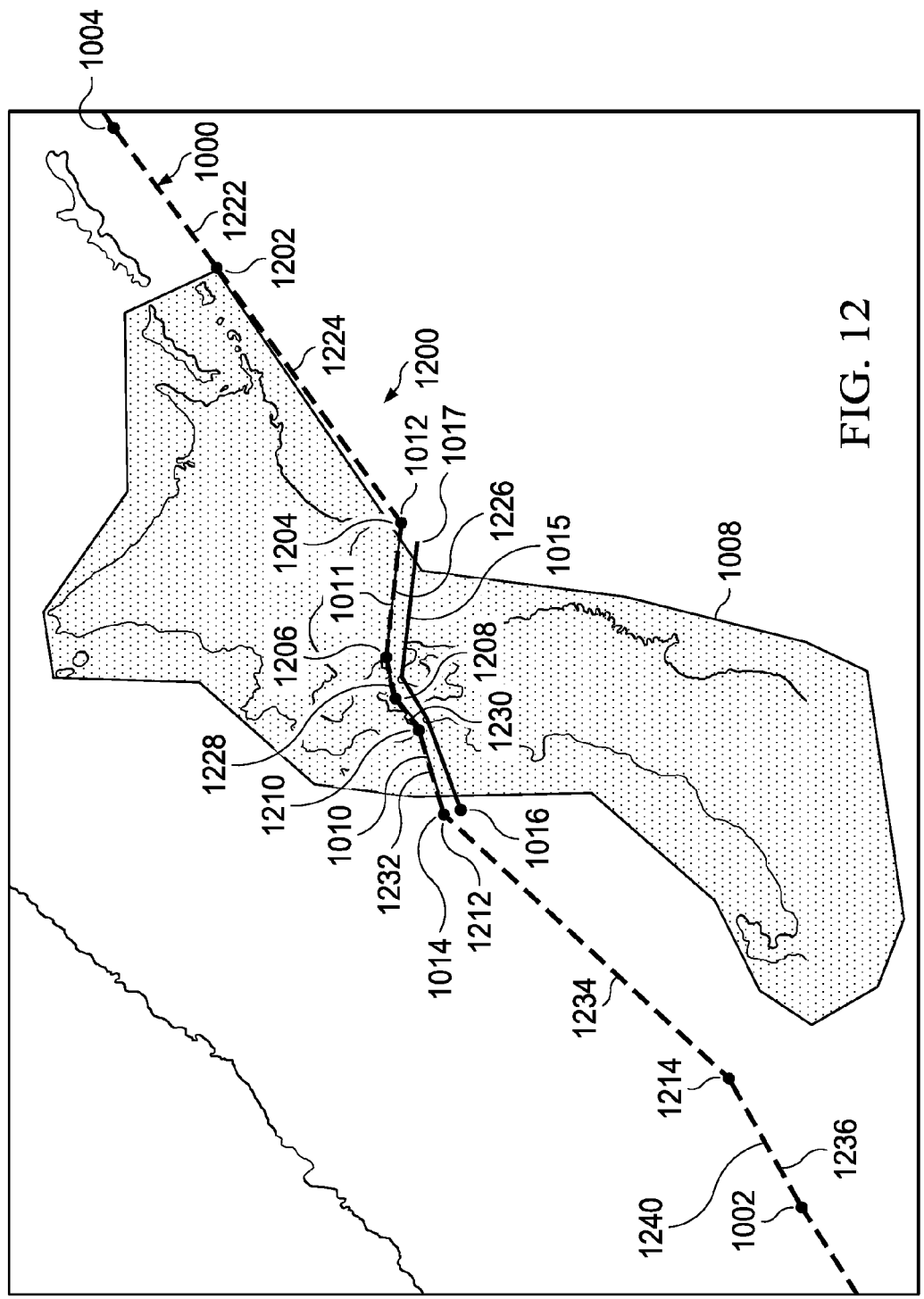
FIG. 12 is an illustration of waypoint generation for a channel in accordance with an advantageous embodiment.

Turning next to FIG. 12, an illustration of waypoint generation for a channel is depicted in accordance with an advantageous embodiment. In this illustrative example, an alternative to a route that goes around region of interest 1008 is a route that passes through channel 1010.

As depicted, an insertion function may be used to generate third group of waypoints 1200. Third group of waypoints 1200 comprises waypoints 1202, 1204, 1206, 1208, 1210, 1212, and 1214. These waypoints, along with waypoints 1002 and 1004, define segments 1222, 1224, 1226, 1228, 1230, 1232, 1234, and 1236.

These waypoints and segments form path 1240 through channel 1010. In this illustrative example, path 1240 provides the shortest route as compared to the other paths for first group of waypoints 1100 and second group of waypoints 1102 as shown in FIG. 11. As a result, third group of waypoints 1200 are inserted into route 1000 in this illustrative example.

Although region of interest 1008 in FIGS. 10-12 is considered a single region of interest, in some illustrative examples, this region of interest may be split into two regions of interest. For example, the first region of interest may be on one side of channel 1010, while the other region of interest may be on the other side of channel 1010.

Further, in some illustrative examples, additional groups of waypoints may be generated in addition to first group of waypoints 1100, second group of waypoints 1002, and third group of waypoints 1200. These additional groups of waypoints may be generated with a greater distance from region of interest 1008.

Also, rather than selecting a group of waypoints for route 1000, new routes may be made using the additional groups of waypoints. These additional routes may be new routes for analysis during an evaluation.

Figure 13:
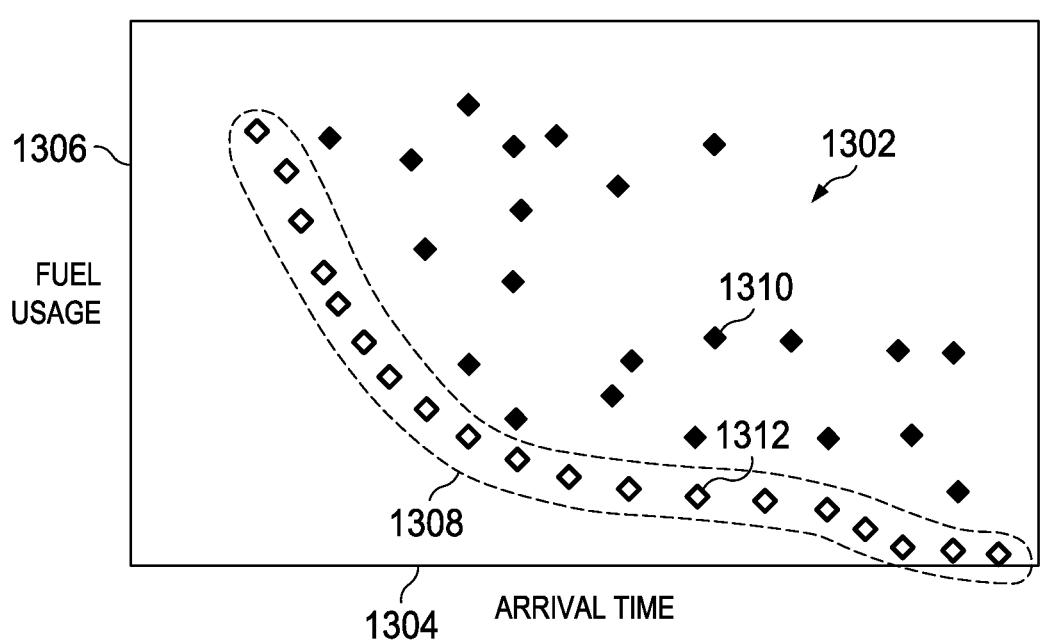
FIG. 13 is an illustration of route selection in accordance with an advantageous embodiment.

With reference now to FIG. 13, an illustration of route selection is depicted in accordance with an advantageous embodiment. In this illustrative example, graph 1300 is a graph in which set of potential routes 1302 is illustrated.

Graph 1300 illustrates two objectives—fuel usage and arrival time. As depicted, x-axis 1304 represents arrival time, while y-axis 1306 represents fuel usage. In this illustrative example, each data point represents a route in set of potential routes 1302. With graph 1300, the value for fuel usage versus arrival time may be seen for different routes.

In these illustrative examples, routes from set of potential routes 1302 may be analyzed to determine which routes will remain in set of potential routes 1302. In this illustrative example, routes that will remain in set of potential routes 1302 are located in portion 1308 of set of potential routes 1302.

As depicted, the selection is performed using dominance in this illustrative example. For example, route 1310 is not selected for inclusion in portion 1308, because additional routes in set of potential routes 1302 are equal to or better than route 1310 for fuel usage and arrival time. Route 1310 may be referred to as a dominated route. As another example, route 1312 is present in portion 1308, because another route that is better than route 1312 for a fuel usage and arrival time is not present.

In this illustrative example, routes within portion 1308 provide the best combination of fuel usage and arrival time. These routes remain in set of potential routes 1302.

With graph 1300, a route may be selected for use from portion 1308. The selection may be made based on an identification of the relationship between fuel usage and arrival time. The selection of a particular route from portion 1308 may be based on identifying priorities between fuel usage and arrival time, constraints on fuel usage and arrival time, or a combination of the two.

If additional processing of routes is desired, set of potential routes 1302 in portion 1308 are used as initial routes for generating additional new routes as described above. Portion 1308 of set of potential routes 1302 is selected for use as initial routes for further processing. The other routes not in portion 1308 are removed from set of potential routes 1302. Thus, the routes remaining in set of potential routes 1302 may be processed to generate additional new routes for evaluation and placed into set of potential routes 374 in FIG. 3.

Figure 14:
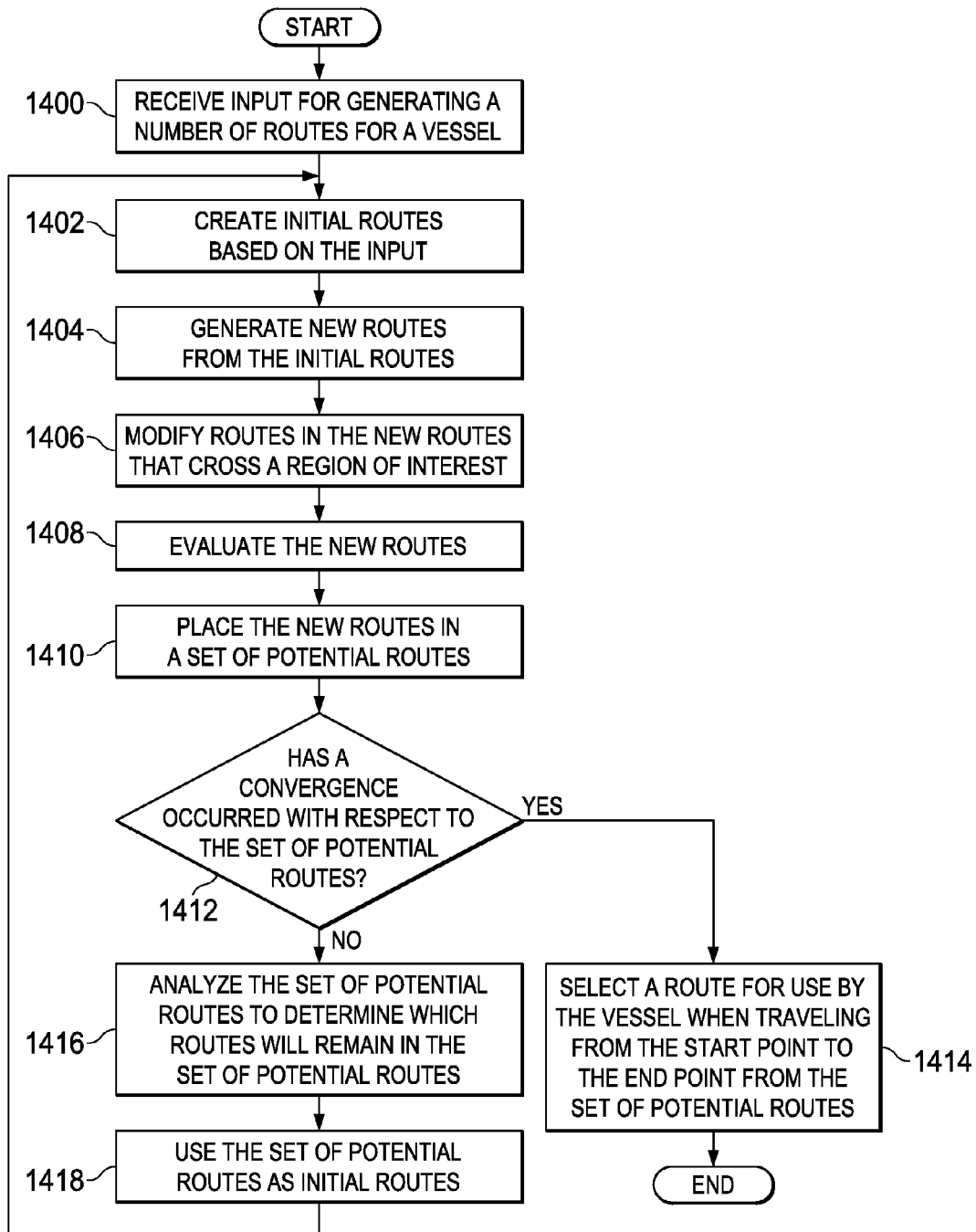
FIG. 14 is an illustration of a flowchart of a process for generating routes for a vessel in accordance with an advantageous embodiment.

Turning now to FIG. 14, an illustration of a flowchart of a process for generating routes for a vessel is depicted in accordance with an advantageous embodiment. The process illustrated in FIG. 14 may be implemented using route generation tool 202 in FIG. 2. The process illustrated in FIG. 14 may be used to generate routes taking into account multiple objectives.

This process may be used prior to a vessel traveling from a start point to an end point. Further, this process may be performed during the time a vessel travels to a destination. In particular, this process may be performed in real-time or near real-time to provide updated routes to a vessel.

In FIG. 14, the process begins by receiving input for generating a number of routes for a vessel (operation 1400). This input may include, for example, a start point, an end point, a number of objectives, a number of constraints for the objectives, and other suitable types of input.

Thereafter, the process creates initial routes based on the input (operation 1402). The initial routes may be any number of routes between a start point and an end point. These initial routes are the routes used to generate a set of potential routes that may be used by the vessel.

The process then generates new routes from the initial routes (operation 1404). In operation 1404, the new routes are generated by modifying the initial routes. This modification may include changing waypoints, changing speeds for segments, combining portions of different routes with each other, and other suitable modifications.

The process then modifies routes in the new routes that cross a region of interest (operation 1406). The modification may include changing waypoints in a new route, adding a number of new routes, or a combination of the two.

For example, waypoints may be changed in the potential route to form a path around the region of interest or through a channel or other passageway in the region of interest. Additionally, a new potential route may be created in addition to the modified potential route. This new potential route may have additional waypoints that form a path around the region of interest or through the channel or other passageway through the region of interest.

Thereafter, the process evaluates the new routes (operation 1408). The evaluation for new routes is performed using a vessel model, such as vessel model 226 in FIG. 2. The vessel model includes code to simulate the performance of the vessel over the different routes. This simulation also may use information, such as navigation information, environmental information, and other suitable types of information. This simulation using the vessel model generates results with values for the number of objectives in the input to form the evaluation of the routes.

The process then places the new routes in a set of potential routes (operation 1410). The new routes form the set of potential routes the first time the evaluation is run in operation 1408. With additional evaluations, the set of potential routes may include routes from prior evaluations.

A determination is made as to whether a convergence has occurred with respect to the set of potential routes (operation 1412). This convergence may be determined by comparing the set of potential routes with prior sets of routes in prior evaluations.

If the routes have converged, the process then selects a route for use by the vessel when traveling from the start point to the end point from the set of potential routes (operation 1414), with the process terminating thereafter. The selection of the route may be performed by route generation tool 202 in FIG. 2. Alternatively, the selection of the route may be performed from user input.

With reference again to operation 1412, if the set of potential routes has not converged, the process then analyzes the set of potential routes to determine which routes will remain in the set of potential routes (operation 1416). This analysis of the set of potential routes is based on the objectives and constraints received in the input in operation 1400. The selections of potential routes that remain are based on the ones that best meet the objectives and constraints. The selection may be based on techniques, such as ranking, dominance, and other suitable techniques for selecting routes.

For example, with dominance, a route may be excluded from the set of potential routes if another route is present that is equal to or better in meeting the number of objectives. In another example, when ranking is used, the routes may be ranked based on meeting the number of objectives, and some number of routes may remain in the set of potential routes based on the ranking while the remaining routes are removed from the set of potential routes.

The process then uses the set of potential routes as initial routes (operation 1418). The process then returns to operation 1402 to generate additional new routes that are added to the set of potential routes after the evaluation. This set of potential routes is used as the initial set of potential routes from which new routes are generated in operation 1404.

Figure 15:
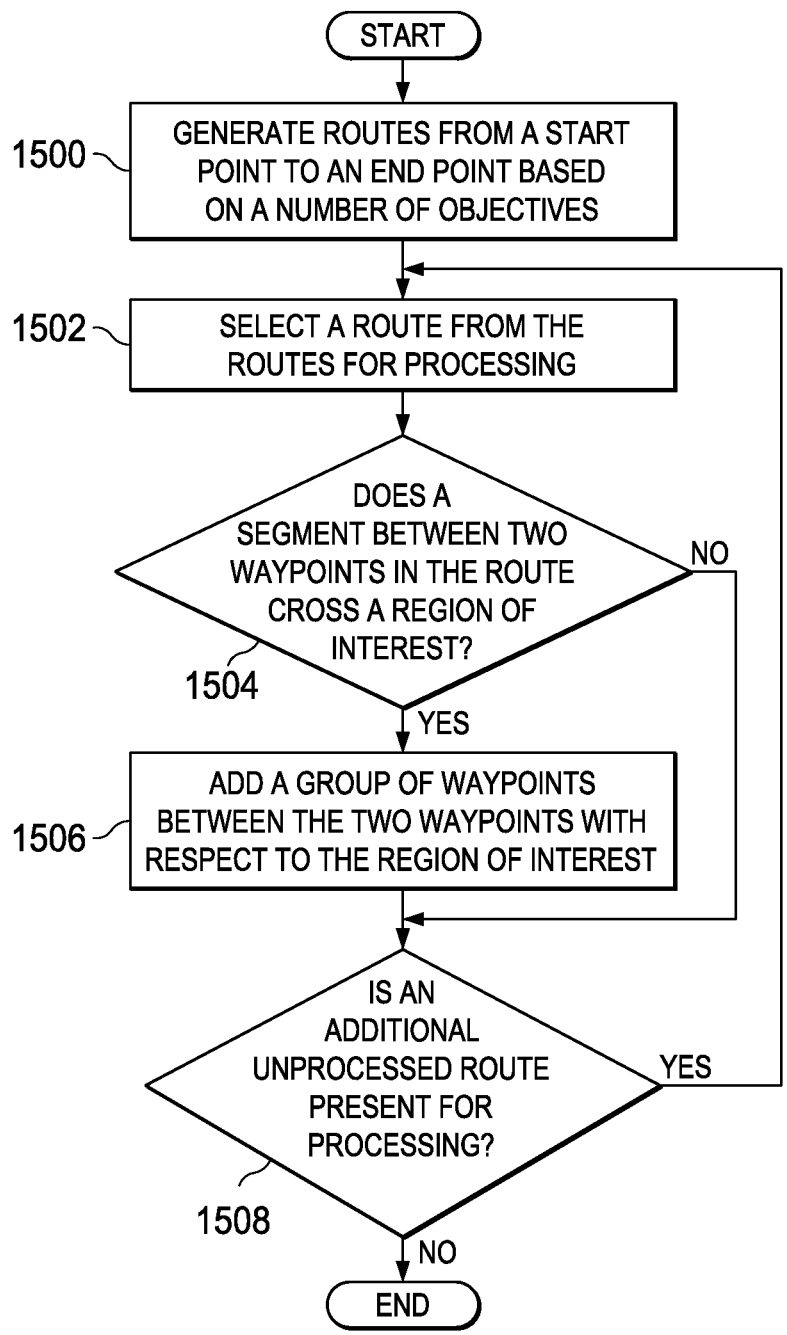
FIG. 15 is an illustration of a flowchart of a process for routing a vessel from a start point to an end point in accordance with an advantageous embodiment.

With reference now to FIG. 15, an illustration of a flowchart of a process for routing a vessel from a start point to an end point is depicted in accordance with an advantageous embodiment. The process illustrated in FIG. 15 may be implemented using route generation tool 202 in FIG. 2.

The process begins by generating routes from a start point to an end point based on a number of objectives (operation 1500). This generation of routes may be performed in a number of different ways. For example, the routes may be generated using any number of different types of route generation techniques. For example, the route generation techniques may be one that uses a spanning tree from an origin to a destination. In other illustrative examples, the process may generate routes and perform optimizations.

The process then selects a route from the routes for processing (operation 1502). The process then determines whether a segment between two waypoints in the route crosses a region of interest (operation 1504). In response to a segment crossing a region of interest, the process adds a group of waypoints between the two waypoints with respect to the region of interest (operation 1506).

The process then determines whether an additional unprocessed route is present for processing (operation 1508). If an additional unprocessed route is present, the process returns to operation 1502. Otherwise, the process terminates. With reference again to operation 1504, if a segment in the route does not cross a region of interest, the process proceeds to operation 1508 as described above.

Figure 16:
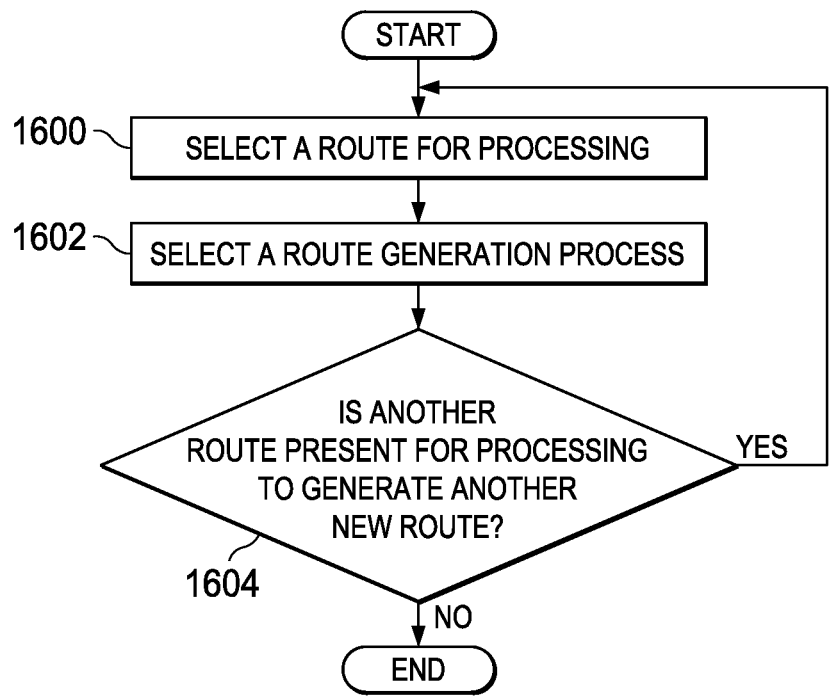
FIG. 16 is an illustration of a flowchart of a process for generating a new route from an initial route in accordance with an advantageous embodiment.

Turning now to FIG. 16, an illustration of a flowchart of a process for generating a new route from an initial route is depicted in accordance with an advantageous embodiment. The process begins by selecting a route for processing (operation 1600). Thereafter, the process selects a route generation process (operation 1602). The selection of the route generation process may be performed randomly. This process may select at least one of shifting waypoints, shifting speeds, combining routes, and other suitable changes. These different changes to the initial route may be performed by route generation tool 202. In particular, functions, such as waypoint function 320, speed function 322, and combining function 323 in FIG. 3 may be used.

The process then determines whether another route is present for processing to generate another new route (operation 1604). If another route is present, the process returns to operation 1600. Otherwise, the process terminates.

Figure 17:
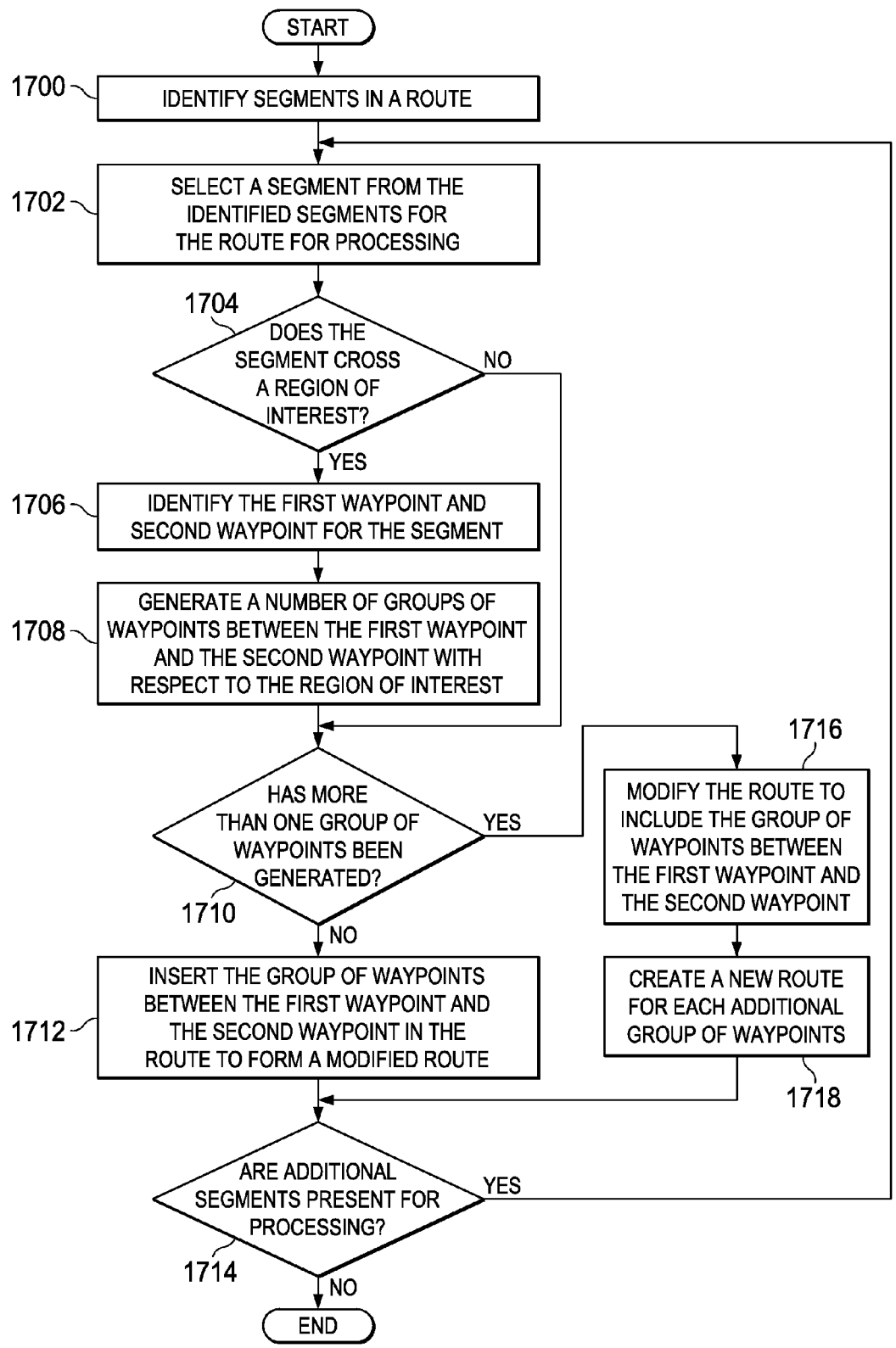
FIG. 17 is an illustration of a flowchart of a process for generating additional waypoints for a route in accordance with an advantageous embodiment.

Turning now to FIG. 17, an illustration of a flowchart of a process for generating additional waypoints for a route is depicted in accordance with an advantageous embodiment. This process may be implemented by insertion function 348 in route generation tool 202 in FIG. 3 when the segment between two waypoints crosses a region of interest.

The process begins by identifying segments in a route (operation 1700). Thereafter, the process selects a segment from the identified segments for the route for processing (operation 1702). A determination is made as to whether the segment crosses a region of interest (operation 1704).

A region of interest may be, for example, at least one of a land mass, a political boundary, a hostile region, or some other suitable region. For example, the region of interest may be a land mass in the form of an island, a chain of islands, a reef, or some other suitable land mass. Additionally, the region of interest may be an area of water off the shore of a country that should not be crossed. As another illustrative example, a hostile region may be a region in which a war is occurring, a blockade is present, pirates are present, or some other treacherous or dangerous area.

If the segment crosses a region of interest, the process identifies the first waypoint and the second waypoint for the segment (operation 1706). The process then generates a number of groups of waypoints between the first waypoint and the second waypoint with respect to the region of interest (operation 1708). Each group of waypoints in the number of groups of waypoints provides a path with respect to the region of interest. This path may be around the region of interest, through the region of interest, or a combination of the two.

For example, a path may extend through a region of interest if the region of interest is a land mass with a channel through which a vessel may travel from one side of the land mass to the other side of the land mass. The selection of a number of groups of waypoints between the first waypoint and the second waypoint may be performed based on a number of objectives for the vessel. This number of groups of waypoints provides a number of paths around or through the region of interest.

In the illustrative examples, whether more than one group of waypoints is generated from a region of interest may vary, depending on the particular implementation and situation. For example, more than one group of waypoints may be added to introduce new routes for consideration based on the size of the land mass. For example, if the land mass is an island, such as Cuba, Jamaica, Haiti, Puerto Rico, or other suitable islands, multiple groups of waypoints may be generated that result in additional routes for consideration. For islands smaller than these, a single group of waypoints may be generated. Of course, other considerations may be used to determine how many groups of waypoints are generated.

A determination is made as to whether more than one group of waypoints has been generated (operation 1710). If only a single group of waypoints has been generated, the process inserts the group of waypoints between the first waypoint and the second waypoint in the route to form a modified route (operation 1712).

A determination is then made as to whether additional segments are present for processing (operation 1714). If additional segments are present, the process returns to operation 1702. Otherwise, the process terminates.

With reference again to operation 1710, if more than one group of waypoints is generated, the process modifies the route to include the group of waypoints between the first waypoint and the second waypoint (operation 1716). Thereafter, the process creates a new route for each additional group of waypoints (operation 1718), with the process then returning to operation 1714 as described above. The new route may be created by adding the group of waypoints to a copy of the route to form a new route. In this manner, a selection may be made between the modified route and the additional routes.

With reference again to operation 1704, if the segment does not cross a region of interest, the process proceeds to operation 1710 as described above.

Figure 18:
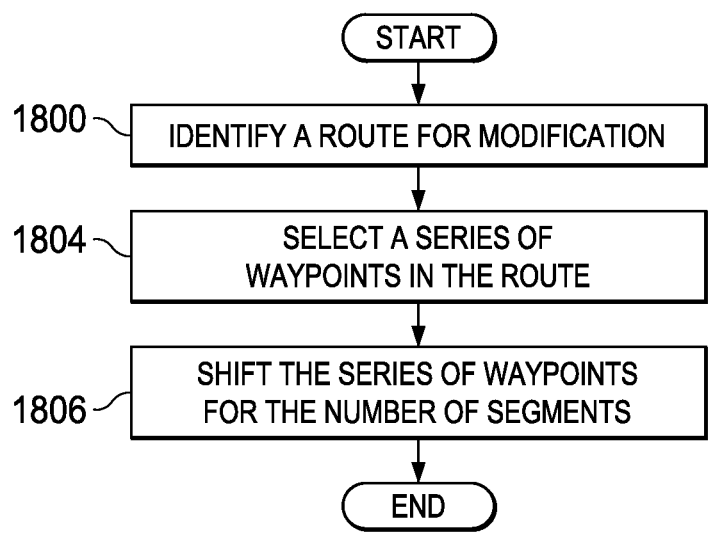
FIG. 18 is an illustration of a flowchart of a process for modifying waypoints in a route in accordance with an advantageous embodiment.

Turning now to FIG. 18, an illustration of a flowchart of a process for modifying waypoints in a route is depicted in accordance with an advantageous embodiment. The process illustrated in FIG. 18 may be implemented in waypoint function 320 in FIG. 3.

As depicted, the process begins by identifying a route for modification (operation 1800). The process then selects a series of waypoints in the route (operation 1804). Thereafter, the process shifts the series of waypoints for the number of segments (operation 1806). The shifting of waypoints in a series of waypoints in operation 1806 may be performed in a number of different ways. For example, the starting waypoint, the ending waypoint, and a maximum offset or shift in a waypoint for a series of waypoints may be selected. This selection may be based on a prior selection or may be performed randomly.

The process terminates thereafter. The modified routes may be used to form new routes 318 in FIG. 3.

Figure 19:
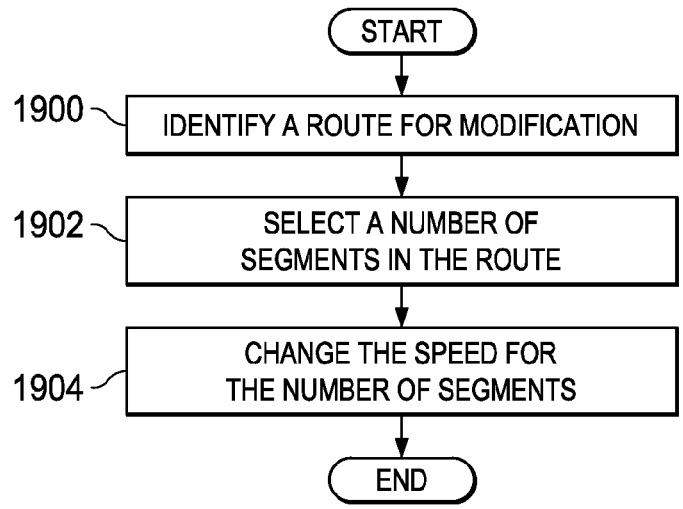
FIG. 19 is an illustration of a flowchart of a process for modifying speeds in a route in accordance with an advantageous embodiment.

Turning now to FIG. 19, an illustration of a flowchart of a process for modifying speeds in a route is depicted in accordance with an advantageous embodiment. The process illustrated in FIG. 19 may be implemented in speed function 322 in FIG. 3.

As depicted, the process begins by identifying a route for modification (operation 1900). The process then selects a number of segments in the route (operation 1902). These segments may be randomly selected or selected in some other manner. The process changes the speed for the number of segments (operation 1904), with the process terminating thereafter. The modified routes may be used to form new routes 318 in FIG. 3.

Figure 20:
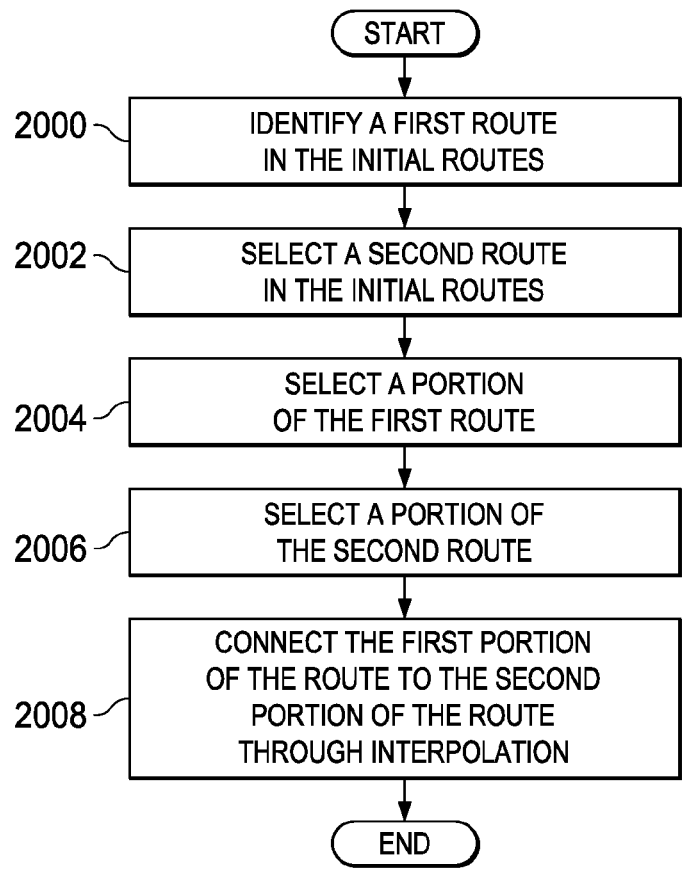
FIG. 20 is an illustration of a flowchart of a process for combining routes to form a new route in accordance with an advantageous embodiment.

With reference now to FIG. 20, an illustration of a flowchart of a process for combining routes to form a new route is depicted in accordance with an advantageous embodiment. The process illustrated in FIG. 20 may be implemented in combining function 323 in FIG. 3.

As depicted, the process begins by identifying a first route in the initial routes (operation 2000). The process then selects a second route in the initial routes (operation 2002). The process then selects a portion of the first route (operation 2004). Next, the process selects a portion of the second route (operation 2006). In operation 2004 and operation 2006, the portions are selected randomly in these illustrative examples.

The process then connects the first portion of the route to the second portion of the route through interpolation (operation 2008), with the process terminating thereafter. Operation 2008 generates new waypoints and segments to connect the two portions of the route. Of course, in some illustrative examples, more than one portion may be selected from each route and interpolation may be performed between the additional portions.

Figure 21:
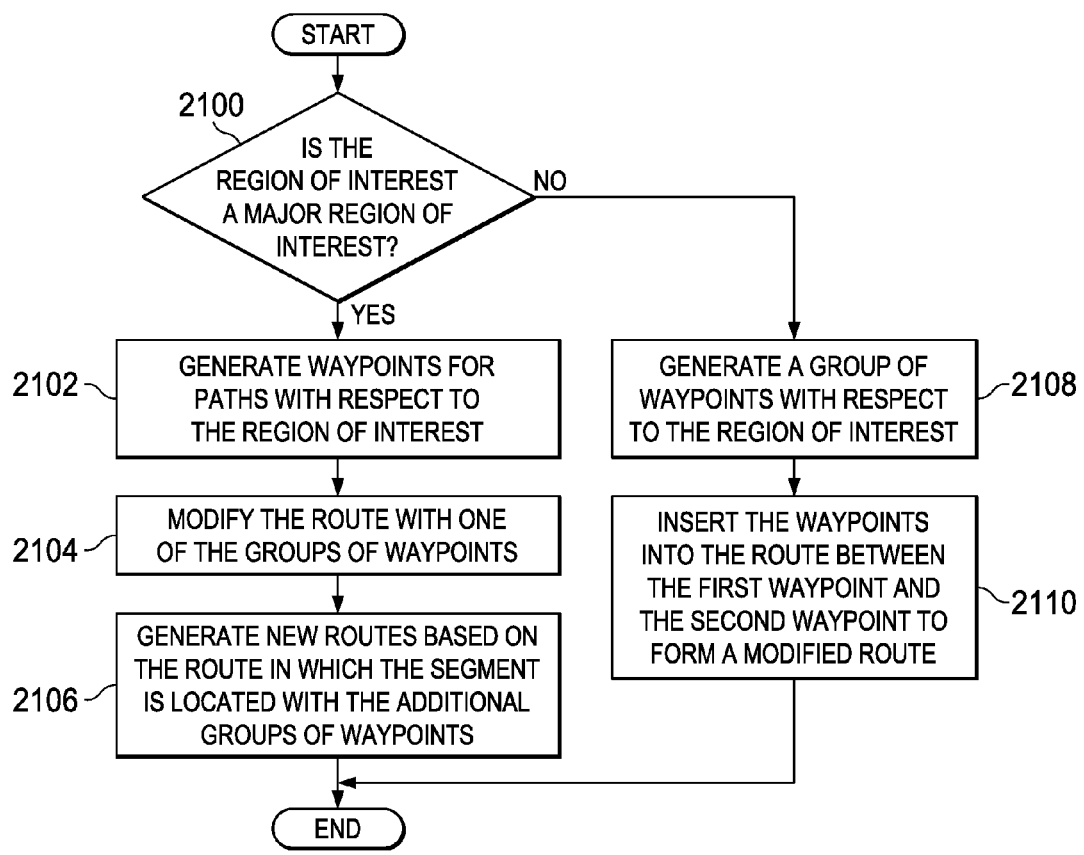
FIG. 21 is an illustration of a flowchart of a process for generating waypoints in accordance with an advantageous embodiment.

Turning now to FIG. 21, an illustration of a flowchart of a process for generating waypoints is depicted in accordance with an advantageous embodiment. The process begins by determining whether the region of interest is a major region of interest (operation 2100). Whether a region of interest is a major region of interest may be determined in a number of different ways. The region of interest may be pre-selected or marked as being major or not major. This identification may be made based on the size, location, type, and other parameters for the region of interest.

If the region of interest is a major region of interest, the process generates waypoints for paths with respect to the region of interest (operation 2102). These waypoints, with respect to the region of interest, may be through or around the region of interest, depending on the region of interest. The process then modifies the route with one of the groups of waypoints (operation 2104). The process then generates new routes based on the route in which the segment is located with the additional groups of waypoints (operation 2106), with the process terminating thereafter.

With reference again to operation 2100, if the region of interest is not a major region of interest, a group of waypoints is generated with respect to the region of interest (operation 2108). Thereafter, the waypoints are inserted into the route between the first waypoint and the second waypoint to form a modified route (operation 2110). The process terminates thereafter.

Figure 22:
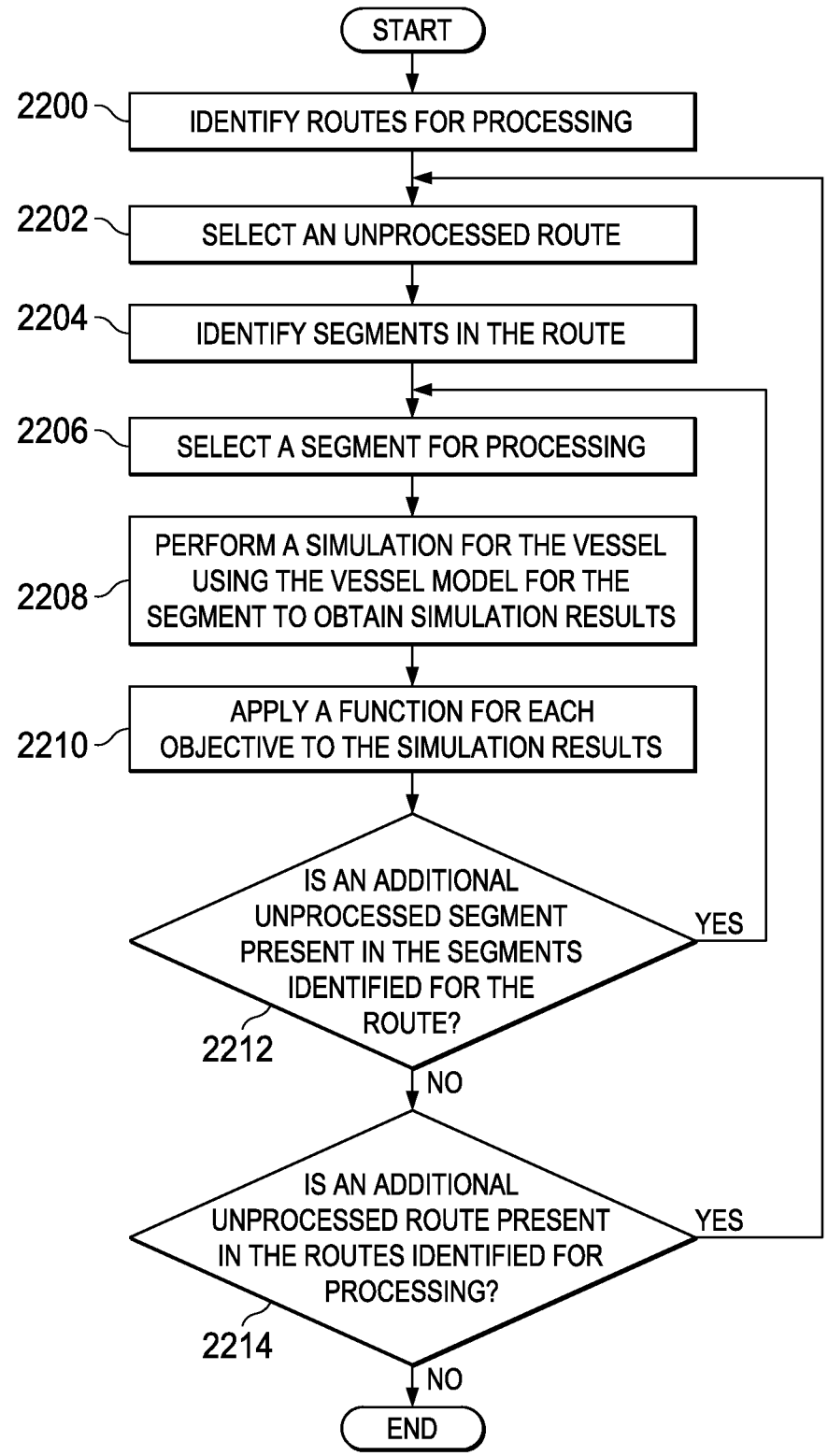
FIG. 22 is an illustration of a flowchart of a process for evaluating routes in accordance with an advantageous embodiment.

With reference now to FIG. 22, an illustration of a flowchart of a process for evaluating routes is depicted in accordance with an advantageous embodiment.

The process begins by identifying routes for processing (operation 2200). The process selects an unprocessed route (operation 2202). The process identifies segments in the route (operation 2204). The process then selects a segment for processing (operation 2206). The process performs a simulation for the vessel using the vessel model for the segment to obtain simulation results (operation 2208). In performing this simulation, the vessel model may operate in an open ocean mode, a littoral mode, or both. Littoral mode areas 359 in navigation information 228 in FIG. 3 may be used to determine when to use an open ocean mode or a littoral mode. A segment may involve the vessel model performing the simulation in both modes for different portions of the segment. The simulation results provide a predicted performance of the vessel for traveling over the segment.

The process then applies a function for each objective to the simulation results (operation 2210). Operation 2210 provides values for the objectives over the segment being processed.

The process then determines whether an additional unprocessed segment is present in the segments identified for the route (operation 2212). If an additional segment is present, the process returns to operation 2206. Otherwise, the process determines whether an additional unprocessed route is present in the routes identified for processing (operation 2214). If an additional unprocessed route is present, the process returns to operation 2202. Otherwise, the process terminates.

The different operations in FIG. 22 generate values for objectives for new routes that are generated. These values may be used to identify routes that best meet the objectives.

Figure 23:
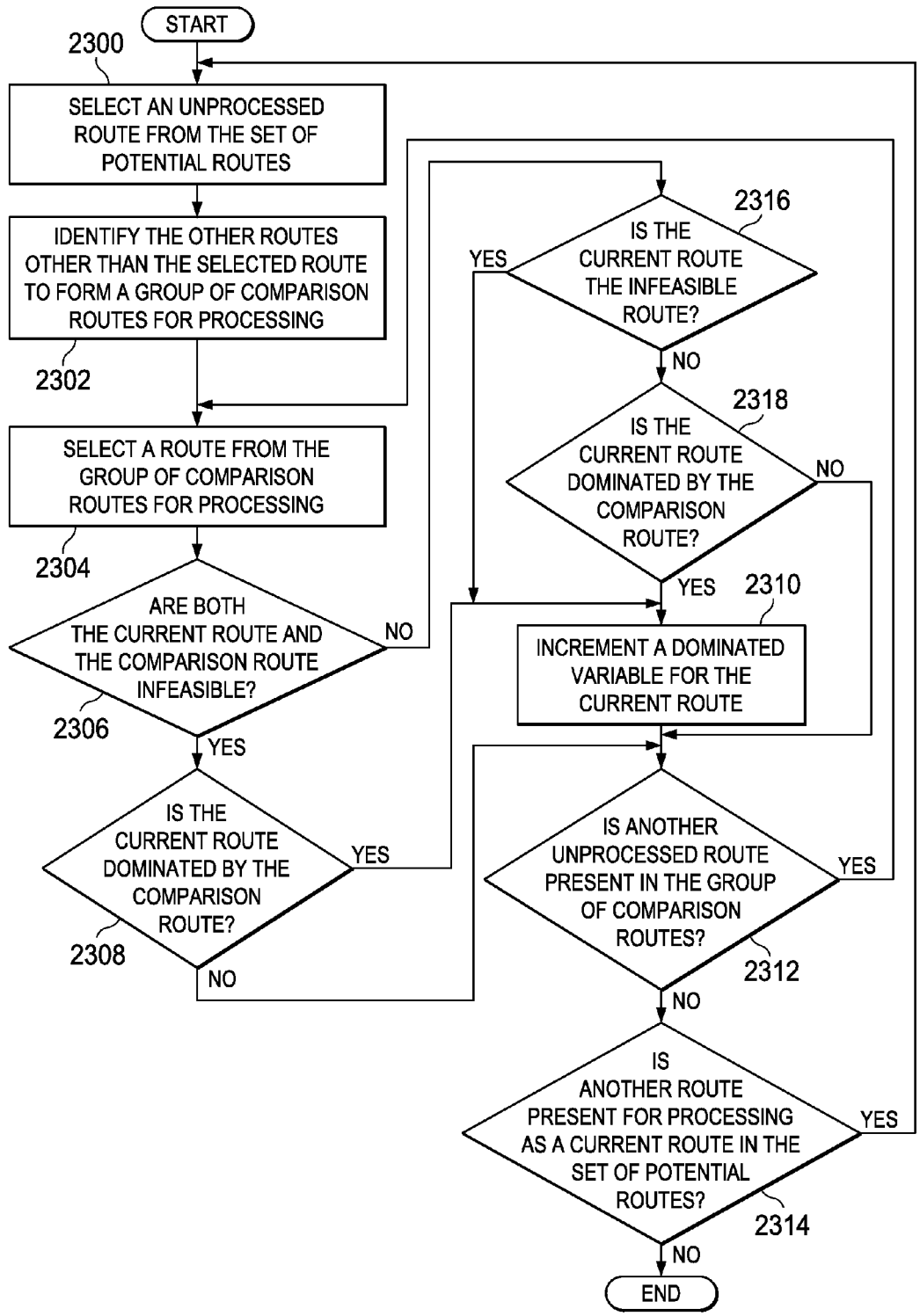
FIG. 23 is an illustration of a flowchart of a process for analyzing a set of potential routes in accordance with an advantageous embodiment.

With reference now to FIG. 23, an illustration of a flowchart of a process for analyzing a set of potential routes is depicted in accordance with an advantageous embodiment. The operations in FIG. 23 are examples of operations that may be used to implement operation 1416 in FIG. 14.

The process begins by selecting an unprocessed route from the set of potential routes as a current route for processing (operation 2300). The process then identifies the other routes other than the selected route to form a group of comparison routes (operation 2302). The process then selects a route from the group of comparison routes for processing (operation 2304).

The process then determines whether both the current route and the comparison route are infeasible (operation 2306). This determination is made by determining whether both routes have exceeded constraints during the simulation of the routes. If both routes are infeasible, a determination is made as to whether the current route is dominated by the comparison route based on the constraints (operation 2308).

If the current route is dominated, the process increments a value for a dominated variable for the current route (operation 2310). The dominated variable is a variable that identifies the number of routes that dominate the current route. As the value of the dominated variable increases, the route is less desirable as one for use as compared to other routes with a lower value for the dominated variable.

The process then determines whether another unprocessed route is present in the group of comparison routes (operation 2312). If another unprocessed route is present in the group of comparison routes, the process returns to operation 2304 to select another route for processing against the current route.

Otherwise, a determination is made as to whether another route is present for processing as a current route in the set of potential routes (operation 2314). If another route is present for processing in the set of potential routes, the process returns to operation 2300. Otherwise, the process terminates.

With reference again to operation 2306, if both routes are not infeasible, a determination is made as to whether the current route is the infeasible route (operation 2316). If the current route is the infeasible route, the process proceeds to operation 2310. Otherwise, both routes are feasible, and the process determines whether the current route is dominated by the comparison route (operation 2318). If the current route is dominated by the comparison route, the process proceeds to operation 2310. Otherwise, the process proceeds to operation 2312.

With reference again to operation 2308, if the current route is not dominated by the comparison route, the process proceeds to operation 2312.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1400, operation 1402, or a combination of the two may be considered a single operation for generating routes from the start point to the end point based on the number of objectives. In another example, operation 1410 may be performed prior to operation 1418. The results from the evaluation may then be used to analyze the new routes placed into the set of potential routes along with other routes already present in the set of potential routes.

Figure 24:
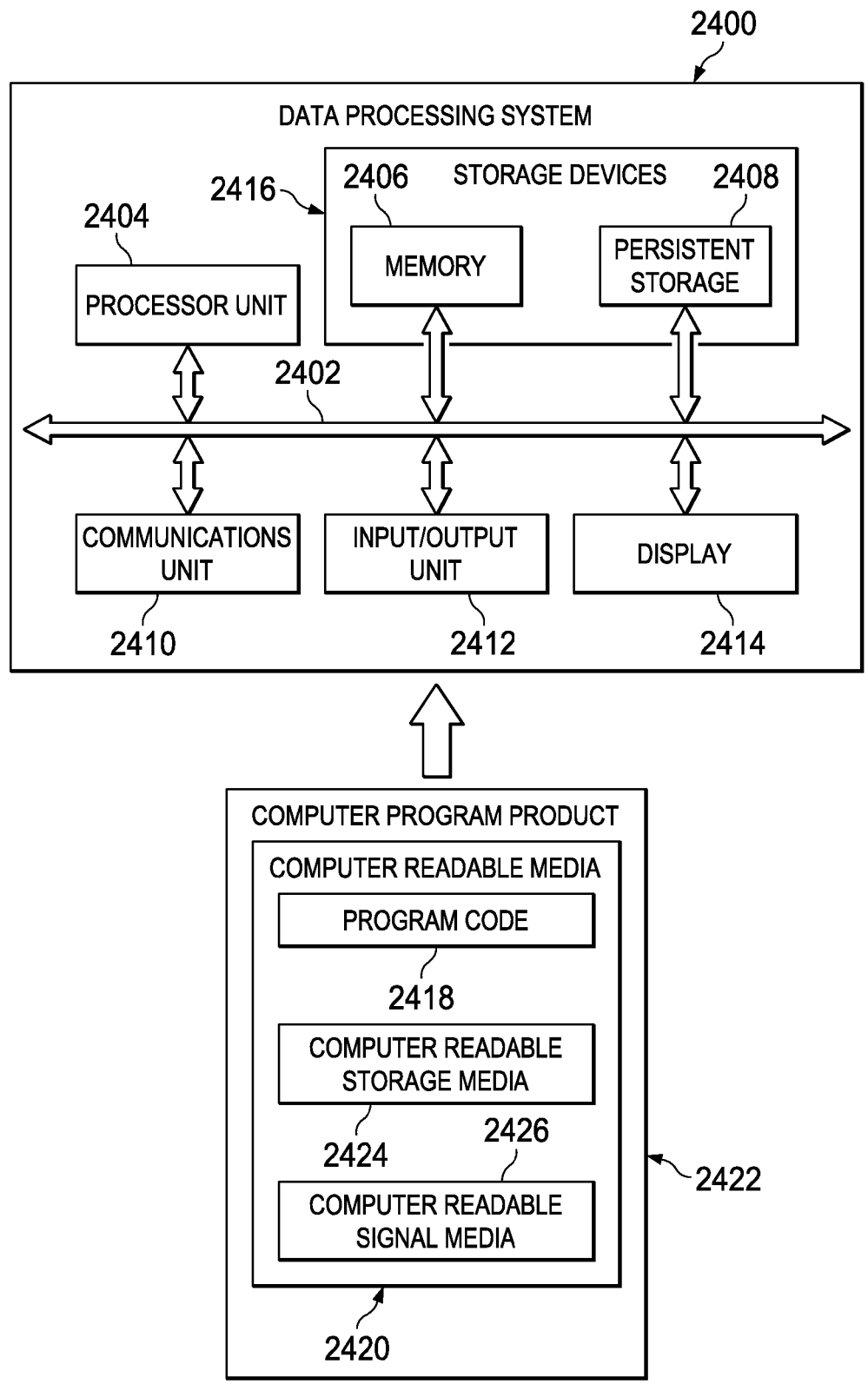
FIG. 24 is an illustration of a block diagram of a data processing system in accordance with an advantageous embodiment.

Turning now to FIG. 24, an illustration of block diagram of a data processing system is depicted in accordance with an advantageous embodiment. Data processing system 2400 may be used to implement server 104, server 106, client computer 113, client computer 114, and client computer 115 in FIG. 1, and one or more computers in computer system 208 in FIG. 2. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, data, program code in functional form, and/or other suitable information either on a temporary basis and/or a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through a keyboard, a mouse, and/or some other suitable input device. Further, input/output unit 2412 may send output to a printer. Display 2414 provides a mechanism to display information to a user.

Instructions for the operating system, applications, and/or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426.

In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2400 are not meant to provide architectural limitations to the manner in which different embodiments may be implemented. The different advantageous embodiments may be implemented in a data processing system including components in addition to and/or in place of those illustrated for data processing system 2400. Other components shown in FIG. 24 can be varied from the illustrative examples shown. The different embodiments may be implemented using any hardware device or system capable of running program code 2418.

With one or more advantageous embodiments, the generation of routes for vessels may be performed more quickly as compared to currently used tools. The different advantageous embodiments may generate routes in minutes rather than hours. For example, a convergence for identifying routes may be reduced from about 2,500 evaluations to about 400 evaluations in some illustrative examples.

Further, the different advantageous embodiments also provide an ability to reduce the number of waypoints initially selected for routes. For example, waypoints may have longer distances in open ocean locations as compared to locations having a region of interest. Additional waypoints may be generated to take into account regions of interest in which more waypoints may be needed to navigate through or around those regions of interest. In this manner, granularity in the number of waypoints used for different types of locations may be changed to reduce the number of waypoints for generating routes.

By taking into account more than one objective, the different advantageous embodiments may provide a greater ability to reduce the cost for traveling from a start point to an end point. Further, these processes may be performed continuously to provide real-time or near real-time route generation that takes into account current weather forecasts. In this manner, routes may be generated while a vessel is traveling to avoid undesired conditions at sea.

The different advantageous embodiments may use an ensemble forecast to take into account uncertainty in a prediction. For example, multiple potential forecasts may be taken into account. As a result, the different advantageous embodiments may continually update a route for a vessel in a manner that increases a likelihood of meeting objectives for the vessel in traveling from a start point to an end point.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for routing a vessel from a start point to an end point, the method comprising:
generating on a processor a plurality of routes from the start point to the end point over an ocean based on a number of objectives, the number of objectives including at least arrival time and fuel usage of the vessel;
determining on the processor whether the plurality of routes include segments that cross a region of interest;
responsive to a segment between two waypoints in a route in the plurality of routes crossing a region of interest, generating on the processor a plurality of groups of waypoints around the region of interest, the plurality of groups of waypoints defining a number of segments including at least a first segment and a second segment, each of the number of segments providing a route with respect to the region of interest;
determining on the processor a predicted performance for each of the number of segments based on at least two of the number of objectives including the arrival time and the fuel usage;
identifying a set of segments, from the number of segments, comprising potential routes from the number of segments, the set of segments in the potential routes selected for dominating the number of segments for both fuel usage and arrival time such that the values for arrival time in the set of segments and the set of values for fuel usage are at least equal to or better than those values for the other routes in the number of segments;
incrementing a variable for the number of segments that has been dominated by another set of segments so as to form an incremented variable, the incremented variables including at least wind and current;
performing a second evaluation of the number of segments with variables that have been incremented;
selecting a segment from among the set of segments to form a selected segment, the selected segment based on the number of objectives and the incremented variables;
adding one of the selected segment from the set of segments to the route between the start point and the end point so as to add a group of waypoints between two waypoints in the route with respect to the region of interest; and
routing the vessel from the start point to the end point using the group of waypoints.

2. The method of claim 1, wherein the first segment and the second segment each includes a number of waypoint and a number of speeds between the waypoints.

3. The method of claim 1, wherein the first segment and the second segment each comprise a group of waypoints that form a path around the region of interest.

4. The method of claim 1, wherein the region of interest is a land mass with a channel and wherein the group of waypoints forms a path through the channel, and further comprising identifying the land mass in a region of interest database.

5. The method of claim 1, wherein the region of interest is a land mass with a channel and wherein adding the group of waypoints between the two waypoints with respect to the region of interest comprises:
generating a first group of waypoints through the channel;
adding the first group of waypoints between the two waypoints in the route;
generating a second group of waypoints around the land mass; and
adding the second group of waypoints between the two waypoints with respect to the region of interest based on the number of objectives in a copy of the route to form a new route.

6. The method of claim 1, wherein the region of interest is selected from one of a land mass, a political boundary, and a hostile region.

7. The method of claim 1, wherein generating the routes from the start point to the end point based on the number of objectives comprises:

generating initial routes from the start point to the end point; and generating new routes from the initial routes, wherein the new routes are based on modifications to the initial routes.

8. The method of claim 7, wherein the modifications comprise at least one of combining a portion of another route with the route, changing a number of speeds for segments in the route, and changing a series of waypoints in the route.

9. The method of claim 1 further comprising:
identifying a number of routes in the routes as ones best meeting the number of objectives as a set of potential routes for the vessel.

10. The method of claim 9 further comprising:
selecting the route for the vessel from the set of potential routes for the vessel.

11. The method of claim 1, wherein the number of objectives further includes at least one of safety of the cargo, safety of the vessel, comfort, maintenance, detectability, and gas emissions.

12. A method for routing a vessel from a start point to an end point, the method comprising:
generating initial routes on a processor;
determining on the processor whether the routes include segments that pass through a region of interest;
generating new routes from the initial routes, wherein the new routes are based on modifications to the initial routes;
adding waypoints with respect to the region of interest to any of the new routes that cross the region of interest;
performing an evaluation on the processor of the new routes to generate values for a number of objectives for the new routes, the number of objectives including at least two objectives selected from the group consisting of: lateness, fuel consumption, safety of the cargo, safety of the vessel, comfort, maintenance, detectability, and gas emissions;
identifying a set of potential routes from the new routes, the set of potential routes dominating the new routes for both fuel usage and arrival time such that the values of fuel consumption and lateness for each of the potential routes are at least equal to or better than the values of fuel consumption and lateness for the other routes in the new routes;
determining whether a desired convergence has occurred for the set of potential routes, the desired convergence established when new routes have not been added to set of potential routes in a selected number of generations of new routes and their evaluation;
performing the steps of using the set of potential routes as the initial routes, generating the new routes from the initial routes, wherein the new routes are based on the modifications to the initial routes;
adding the waypoints with respect to the region of interest to the any of the new routes that cross the region of interest; and performing the evaluation using the new routes to generate values for the number of objectives for the new routes until the desired convergence has occurred;
incrementing a variable for the number of segments that has been dominated by another set of segments;
performing a second evaluation of the number of segments with variables that have been incremented;
selecting a selected route in the set of potential routes based on the number of objectives for each route in the potential routes; and routing the vessel from the start point to the end point using selected route.

13. The method of claim 12, wherein the modifications comprise at least one of combining a portion of another route with the new routes, changing a number of speeds for segments in the new routes, and changing a series of waypoints in the new routes.

14. A vessel routing system comprising:
a processor configured to execute a route generation tool configured to generate new routes from a start point to an end point based on a number of at least four objectives, the at least four objectives comprising arrival time, fuel usage, winds, and currents;
the processor further configured, responsive to a segment between two waypoints in a route in the routes crossing a region of interest, to add a group of waypoints between the two waypoints with respect to the region of interest;
the processor configured to generate a number of routes that provide a desired route for the region of interest;
a region of interest database that includes information regarding a number of regions of interest, the processor configured to execute the route generation tool receiving information from the region of interest database;
the processor configured to evaluate a predicted performance for the number of new routes based on the at least four of the number of objectives including arrival time, fuel usage, winds, and currents; identify a set of potential routes from the new routes, the set of potential routes including first segments dominating second segments in the new routes for both fuel usage and arrival time, such that the set of potential routes includes values of fuel usage and arrival time for the potential routes that are at least equal to or better than the values for the other routes in the new routes; and select a selected route in the set of potential routes based on the number of objectives for each route in the potential routes; and determine whether a desired convergence has occurred for the set of potential routes, the desired convergence established when new routes have not been added to set of potential routes in a selected number of generations of new routes and their evaluation; and
the processor ordering the vessel to navigate from the start point to the end point using the selected route after the desired convergence is established.

15. The vessel routing system of claim 14, wherein the group of waypoints forms a path around the region of interest.

16. The vessel routing system of claim 14, wherein the region of interest is a land mass with a channel and wherein the group of waypoints forms a path through the channel.

17. The vessel routing system of claim 14, wherein the region of interest is a land mass with a channel and wherein in being configured to add the group of waypoints between the two waypoints with respect to the region of interest, the processor that executes the route generation tool being configured to use the route generation tool to generate a first group of waypoints through the channel; generate a second group of waypoints around the land mass; select from between the first group of waypoints and the second group of waypoints based on the number of objectives to form a selected group of waypoints; and add the selected group of waypoints between the two waypoints.

18. The vessel routing system of claim 14, wherein in being configured to add the group of waypoints between the two waypoints with respect to the region of interest, the processor that executes the route generation tool being configured to use the route generation tool to generate a plurality of groups of waypoints around the region of interest; select the group of waypoints from the plurality of groups of waypoints based on the number of objectives to form a selected group of waypoints; and add the selected group of waypoints between the two waypoints.

19. The vessel routing system of claim 14, wherein the region of interest is a land mass with a channel and wherein in being configured to add the group of waypoints between the two waypoints with respect to the region of interest, the processor that executes the route generation tool being configured to use the route generation tool to generate a first group of waypoints through the channel; add the first group of waypoints between the two waypoints in the route; and is further configured to generate a second group of
- waypoints around the land mass; and add the second group of waypoints between the two waypoints with respect to the region of interest based on the number of objectives in a copy of the route to form a new route.

20. The vessel routing system of claim 14, wherein the region of interest is selected from one of a land mass, a political boundary, and a hostile region.

\* \* \* \* \*